(12) United States Patent
Kitabayashi et al.

(10) Patent No.: US 7,175,283 B2
(45) Date of Patent: Feb. 13, 2007

(54) OPTICAL DEVICE, OPTICAL DEVICE MANUFACTURING METHOD, AND PROJECTOR

(75) Inventors: Masashi Kitabayashi, Horigane-mura (JP); Hidetoshi Hashizume, Hotaka-machi (JP)

(73) Assignee: Seiko Epson Corporation, Tokyo (JP)

( * ) Notice: Subject to any disclaimer, the term of this patent is extended or adjusted under 35 U.S.C. 154(b) by 190 days.

(21) Appl. No.: 11/076,188

(22) Filed: Mar. 10, 2005

(65) Prior Publication Data

US 2005/0200813 A1  Sep. 15, 2005

(30) Foreign Application Priority Data

Mar. 10, 2004 (JP) ............................. 2004-067447

(51) Int. Cl.
*G03B 21/18* (2006.01)
*G03B 21/26* (2006.01)

(52) U.S. Cl. ......................................... 353/54; 353/30
(58) Field of Classification Search .................. 353/30, 353/52, 54
See application file for complete search history.

(56) References Cited

U.S. PATENT DOCUMENTS

2005/0270495 A1* 12/2005 Ohkubo et al. ............... 353/54

2006/0209266 A1* 9/2006 Utsunomiya .................. 353/54

FOREIGN PATENT DOCUMENTS

JP  A-2001-159684  6/2001
JP  A-2003-124670  4/2003

* cited by examiner

*Primary Examiner*—Rodney Fuller
(74) *Attorney, Agent, or Firm*—Oliff & Berridge, PLC

(57) ABSTRACT

Exemplary embodiments provide an optical device, optical device manufacturing method, and projector that can easily position an optical modulation element in a predetermined position. The optical device includes an optical modulation element holder to hold an optical modulation element thereon so as to be able to transfer heat to cooling fluid within cooling chambers, a plurality of fluid circulation members connected in communication to the cooling chambers, and a cooling fluid relay section that, disposed at a predetermined position relative to the optical axis of a luminous flux emitted from a light source, relays cooling fluid transferred via the plurality of fluid circulation members. Out of the plurality of fluid circulation members, fluid circulation members whose one-side end are connected in communication to the cooling chambers of the optical modulation element holder are formed so that the another-side end thereof protrudes toward a luminous flux emergent side. Insertion holes capable of receiving therethrough the another-side end of the fluid circulation members are formed in a cooling fluid relay section.

16 Claims, 13 Drawing Sheets

F I G. 1 0
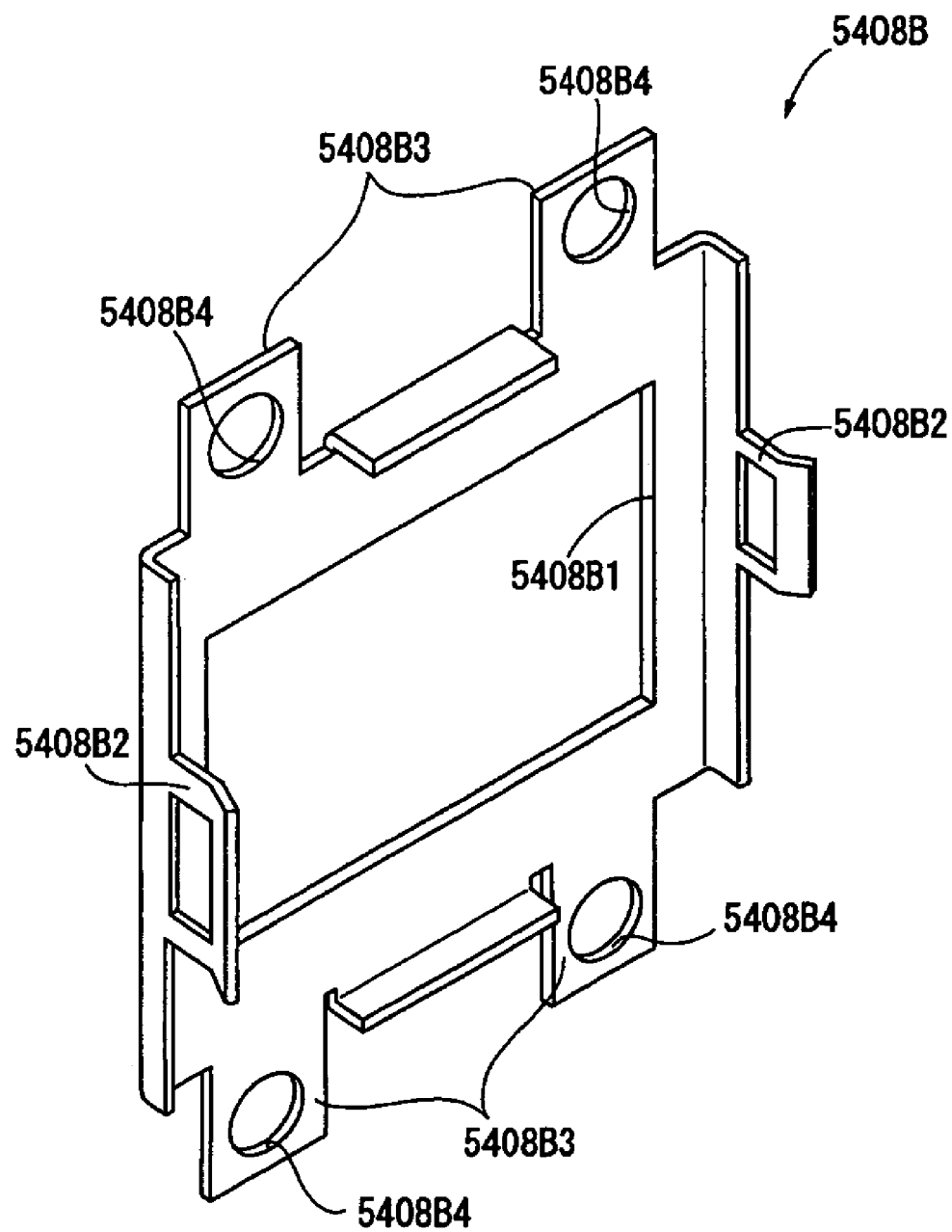

OPTICAL DEVICE, OPTICAL DEVICE MANUFACTURING METHOD, AND PROJECTOR

BACKGROUND

Exemplary embodiments relate to an optical device, an optical device manufacturing method, and a projector.

A related art projector includes an optical modulation device to modulate a luminous flux emitted from a light source in response to image information to form an optical image, and a projection optical device to magnify and project the luminous flux modulated by the optical modulation device.

Out of these devices, the optical modulation device generally adopts, for example, an optical modulation element of active matrix drive mode having an electro-optic material, such as a liquid crystal hermetically sealed between a pair of substrates. Specifically, the pair of substrates configuring this optical modulation element, disposed on the luminous flux emergent side, includes: a drive substrate, formed with data lines, scanning lines, a switching element, a pixel electrode, and the like, to apply a drive voltage to the liquid crystal; and an opposite substrate that is disposed on the luminous flux incident side and is formed with a common electrode, a black mask, and the like.

An incident side polarization plate and emergent side polarization plate that transmit a luminous flux having a predetermined polarization axis are disposed on the luminous flux incident side and luminous flux emergent side of this optical modulation element.

When the optical modulation element is irradiated with the luminous flux emitted from the light source, the temperature of the optical modulation element tends to rise due to light absorption by a liquid crystal layer, light absorption by the data lines and scanning lines formed in the drive substrate, and light absorption by a black matrix and the like formed in the opposite substrate. Out of luminous fluxes emitted from the light source and luminous fluxes transmitted through the optical modulation element, a luminous flux that does not have the predetermined polarization axis is absorbed by the incident side polarization plate and emergent side polarization plate, so that heat tends to be generated in the polarization plates.

A related art projector has such an optical element inside thereof that is configured to include a cooling device using cooling fluid in order to reduce a rise in temperature of the optical element (e.g., see JP-A-1-159684).

That is, the cooling device described in JP-A-1-159684 includes a cooling chamber that supports the optical modulation element and the polarization plate on the light source side in spaced relation to each other and whose inside is filled with cooling fluid. This cooling chamber is connected in communication to a radiator and a fluid pump by tubes or the like capable of circulating cooling fluid inside thereof. Consequently, the inside cooling fluid circulates, via the tubes or the like, through the flow path from the cooling chamber through the radiator and the fluid pump to the cooling chamber. With such a configuration, heat generated in the optical modulation element and incident side polarization plate due to the luminous flux irradiated from the light source is radiated to the cooling fluid.

SUMMARY

In the cooling device described in JP-A-1-159684, the cooling chamber, radiator, fluid pump, and the like are integrated by the tubes or the like. Consequently, when the optical modulation element is to be positioned properly with respect to the optical axis of the luminous flux emitted from the light source, when the optical modulation element is deviated from a proper position, or in like case, the position of the cooling chamber need be altered by, for example, bending the tubes or the like, thus making it difficult to position the optical modulation element in position. Undesired light is projected onto a screen when the, optical modulation element is deviated from a predetermined position relative to the optical axis of the luminous flux emitted from the light source.

Exemplary embodiments provide an optical device, optical device manufacturing method, and projector that can easily position an optical modulation element in a predetermined position.

The optical device of the exemplary embodiments includes a light source; an optical modulation element to modulate a luminous flux emitted from the light source in response to image information and to form an optical image; an optical modulation element holder that is formed with cooling chambers having cooling fluid sealed in an interior, and that holds the optical modulation element so as to be able to transfer heat to the cooling fluid within the cooling chambers; a plurality of fluid circulation members that are connected in communication to the cooling chambers of the optical modulation element holder and that guide the cooling fluid to an exterior of the cooling chambers and lead the cooling fluid again into the interior of the cooling chambers; and a cooling fluid relay section that is disposed at a predetermined position relative to an optical axis of the luminous flux emitted from the light source and that relays, via the plurality of fluid circulation members, at least one of cooling fluid moving from the exterior to the interior of the cooling chambers of the optical modulation element holder, and cooling fluid moving from the interior to the exterior of the cooling chambers of the optical modulation element holder. The optical modulation holder defining an inflow port to allow the cooling fluid to flow into the interior of the cooling chambers and an outflow port to allow the cooling fluid inside the cooling chambers to the exterior of the cooling chambers; the plurality of fluid circulation members including fluid circulation members that each have one-side end connected in communication to the inflow port and outflow port so that another-side end thereof protrudes in the optical axis direction of the luminous flux emitted from the light source; and the cooling fluid relay section defining insertion holes that extend inwardly through the cooling fluid relay section and that are capable of receiving therethrough the another-side end of the fluid circulation members connected in communication to the inflow port and outflow port.

Here, at least one set of the inflow and outflow ports need only be formed in the optical modulation element body, or two or more sets of the inflow and outflow ports may be formed therein. That is, at least two insertion holes need only be formed in the cooling fluid relay section in response to at least two fluid circulation members connected in communication to the inflow port and outflow port.

The cooling fluid relay section may be configured of one member so as to relay any of the cooling fluid moving from the exterior to the interior of the cooling chambers and the cooling fluid moving from the interior to the exterior of the cooling chambers. Otherwise, the cooling fluid relay section may be configured of two members so as to relay the cooling fluid.

In exemplary embodiments, out of the plurality of fluid circulation members configuring the optical device, the at least two fluid circulation members whose one-side end are connected in communication to the inflow port and outflow port are formed so that the another-side end thereof protrudes in the optical axis direction of the luminous flux emitted from the light source. The at least two insertion holes that extend inwardly through the cooling fluid relay section are formed in the cooling fluid relay section configuring the optical device. Consequently, to assemble the optical device, the other-side end of the fluid circulation members connected to the optical modulation element holder are inserted through the insertion holes. In this state, the insertion condition for these insertion holes through the fluid circulation members is altered, thereby making it possible to carry out the positional adjustment of the optical modulation element held on the optical modulation element holder. Accordingly, there is no need to bend the fluid circulation members connected to the optical modulation element holder. Thus, the liquid crystal panels can be easily positioned in a predetermined position on the optical axis of the luminous flux emitted from the light source.

In the optical device of exemplary embodiments, preferably, the cooling fluid relay section includes a first relay section to relay the cooling fluid moving from the exterior to the interior of the cooling chambers of the optical modulation element holder and a second relay section to relay the cooling fluid moving from the interior to the exterior of the cooling chambers of the optical modulation element holder; the optical modulation element holder including a pair of frame-like members that are formed with openings corresponding to image formation regions of the optical modulation element and that clamp the optical modulation element therebetween, and a pair of light-transmissive substrates disposed on surface sides of the pair of frame-like members opposite the opposed surfaces thereof; the openings of the pair of frame-like members being closed, by the optical modulation element and the pair of light-transmissive substrates, on the sides of the opposed surfaces of the pair of frame-like members and on their face sides opposite the opposed surfaces, thereby forming the cooling chambers inside both the pair of frame-like members; the inflow port, with the optical device assembled, being formed at a side end of each of the pair of frame-like members on the first relay section side; the outflow port, with the optical device assembled, being formed at a side end of each of the pair of frame-like members on the second relay section side; and the first relay section and second relay section defining insertion holes that extend inwardly through the first relay section and the second relay section and that are capable of receiving therethrough the another-side end of the fluid circulation members connected in communication to the inflow port and outflow port.

Here, the inflow port and outflow port need only be formed in each of the pair of frame-like members. For example, one set of the inflow and outflow ports may be formed in each of the pair of frame-like members, or two or more sets may be formed in each thereof. That is, at least two insertion holes need only be formed in the first relay section in response to at least two fluid circulation members connected in communication to the inflow ports. Similarly, at least two insertion holes need only be formed in the second relay section corresponding to at least two fluid circulation members connected in communication to the outflow ports.

In exemplary embodiments, the optical modulation element holder includes a pair of frame-like members and a pair of light-transmissive substrates, and the cooling chambers are formed inside the pair of frame-like members, respectively. Out of these members, the inflow port and outflow port are formed in each of the pair of frame-like members. At least two insertion holes are formed in each of the first and second relay sections forming the cooling fluid relay section. Consequently, the optical modulation element holder and cooling fluid relay section are connected together by at least four fluid circulation members, which can reinforce the support condition for the optical modulation element holder with respect to the cooling fluid relay section. To assemble the optical device, it is possible to easily carry out the alteration of the insertion condition for the another-side ends of the at least four fluid circulation members through the insertion holes. This makes it possible to further easily carry out the positioning of the optical modulation element while stably supporting the optical modulation element holder with respect to the cooling fluid relay section.

The cooling chambers are formed on the luminous flux incident side and luminous flux emergent side of the optical modulation element, so that both the luminous flux incident and emergent sides of the optical modulation element can be cooled with cooling fluid, which can efficiently cool the optical modulation element.

Furthermore, the cooling fluid relay section has a two-body configuration made up of the first relay section and second relay section. Therefore, in the cooling chambers of the optical modulation element holder, it is possible to smoothly carry out the circulation of cooling fluid moving from upstream to downstream. This can accelerate the convective velocity of cooling fluid and thus can further efficiently cool the optical modulation element.

In the optical device of exemplary embodiments, preferably, the pair of frame-like members have a rectangular shape in plan view; and the inflow port and outflow port are formed near the diagonal positions of the opposed side ends of the frame-like member. When the pair of frame-like members are combined together and the inflow port and outflow port of any one of the pair of frame-like members are projected on the other frame-like member, the inflow port and outflow port thus projected are disposed at positions of the opposed side end of the other frame-like member and opposite the inflow port and outflow port of the other frame-like member.

In exemplary embodiments, the pair of frame-like members have a rectangular shape in plan view. The inflow port and outflow port formed in each of the pair of frame-like members are disposed near the four corner positions of the rectangular shape in top plan. Thereby, the support condition for the optical modulation element holder with respect to the cooling fluid relay section can be further stably supported by the four fluid circulation members. At the same time, the positioning of the optical modulation element can be still further easily carried out.

The inflow port and outflow port are formed near diagonal positions of the frame-like member at the opposed side end thereof. Therefore, cooling fluid can convectively circulate all over the cooling chambers, which can efficiently cool the optical modulation element without accumulating cooling fluid within the cooling chambers.

In the optical device of exemplary embodiments, preferably, the optical modulation element holder includes a pair of light-transmissive substrate pressing members for pressing and fixing the pair of light-transmissive substrates to the pair of frame-like members, at least one of the pair of light-transmissive substrate pressing members having, support portions, the support portions defining a plurality of holes for receiving therethrough the another-side end of the fluid circulation members connected in communication to the inflow port and outflow port and which support the fluid circulation members.

In exemplary embodiments, support portions defining a plurality of holes are formed in any one of the pair of light-transmissive substrate pressing members forming the optical modulation element holder. Consequently, when the optical device is assembled, the fluid circulation members, for providing a connection between the optical modulation element holder and the cooling fluid relay section are inserted through the plurality of holes of the support portions of the polarization plate pressing member. Accordingly, this can reinforce the support condition for the optical modulation element holder with respect to the cooling fluid relay section. Thus, the impact of external force is reduced, which makes it possible to avoid the displacement of the optical modulation element holder, e.g., the displacement of the optical modulation element with respect to the cooling fluid relay section.

The polarization plate pressing member having the support portions makes it possible to reduce the impact of external force on the fluid circulation members providing a connection between the optical modulation element holder and the cooling fluid relay section. Therefore, the connection condition between the insertion holes of the cooling fluid relay section and the fluid circulation members, and the connection condition between the inflow and outflow ports of the optical modulation holder and the fluid circulation members can be improved. This can favorably reduce the leakage of cooling fluid from these connections.

In exemplary embodiments, preferably, the optical device further includes at least one optical conversion element to convert the optical characteristic of an incident luminous flux, the optical conversion element including the light-transmissive substrate and an optical conversion film that is formed on the light-transmissive substrate, and the light-transmissive substrate configuring the optical modulation element holder and the optical conversion element.

Here, the optical conversion element can adopt, for example, a polarization plate, a retardation plate, or a viewing angle correction plate.

According to exemplary embodiments, at least one of the light-transmissive substrates configuring the optical modulation element holder is the light-transmissive substrate configuring the optical conversion element. Therefore, it is possible to easily carry out the positioning of not only the optical modulation element but also the optical conversion element. Heat generated in an optical conversion film by the luminous flux emitted from the light source can also be radiated to cooling fluid circulating by convection in the cooling chambers.

In the optical device of exemplary embodiments, preferably, the optical device further includes support members that support the fluid circulation members that are interposed between the optical modulation element holder and the cooling fluid relay section, the support members defining a plurality of holes for receiving therethrough the other-side end of the fluid circulation members connected in communication to the inflow port and outflow port.

In exemplary embodiments, the optical device includes support members defining a plurality of holes. Consequently, when the optical device is assembled, the fluid circulation members providing a connection between the optical modulation element holder and the cooling fluid relay section are inserted through the plurality of holes of the support members. Accordingly, this can reinforce the support condition for the optical modulation element holder with respect to the cooling fluid relay section. Thus, the impact of external force is reduced, which makes it possible to avoid the displacement of the optical modulation element holder, e.g., the displacement of the optical modulation element with respect to the cooling fluid relay section.

The support members make it possible to reduce the impact of external force on the fluid circulation members providing a connection between the optical modulation element holder and the cooling fluid relay section. Therefore, the connection condition between the insertion holes of the cooling fluid relay section and the fluid circulation members, and the connection condition between the inflow and outflow ports of the optical modulation holder and the fluid circulation members can be improved. This can favorably reduce the leakage of cooling fluid from these connections.

In the optical device of exemplary embodiments, preferably, the optical device further includes: a plurality of the optical modulation elements; a plurality of the optical modulation element holders corresponding to the plurality of the optical modulation elements; and a color combination optical device having a plurality of luminous flux incident side end faces disposed on the plurality of the optical modulation element holders, the luminous flux incident side end faces combining luminous fluxes modulated by the plurality of the optical modulation elements, the cooling fluid relay section including: a first relay section attached to at least one of the end faces of the color combination optical device intersecting with the plurality of luminous flux incident side end faces, the first relay section having multiple branches to provide the cooling fluid to flow into the interior of the cooling chambers of the plurality of the optical modulation element holders; and a second relay section attached to another end face of the color combination optical device intersecting with the plurality of luminous flux incident side end faces to collectively feed in the cooling fluid flowing out from the interior of the plurality of the optical modulation element holders, and the first relay section and second relay section defining insertion holes that extend inwardly through the first relay section and the second relay section and being capable of receiving therethrough the another-side end of the fluid circulation members connected in communication to the inflow ports and outflow ports of the plurality of the optical modulation element holders.

In exemplary embodiments, the optical device includes a color combination optical device. The first relay section and second relay section forming the cooling fluid relay section are attached to the end faces of the color combination optical device intersecting with the plurality of luminous flux incident side end faces thereof. Insertion holes, capable of receiving therethrough the another-side end of the fluid circulation members connected in communication to the plurality of the optical modulation element holders, are defined in the first relay section and second relay section. Thereby, there is no need to provide a plurality of the cooling fluid relay sections in response to the plurality of the optical modulation element holders. Thus, the members for supporting the plurality of the optical modulation element holders are made into a common one, and the optical device is formed into a compact configuration, which enables a reduction in size of the optical device.

The cooling fluid relay section is made common. Thereby, even when the optical modulation element holder is connected to the other members such as the main tank and fluid pump, the cooling fluid relay section and the other members need only be connected together by the fluid circulation members. Thus, there is no need for the fluid circulation members to provide direct connections between the plurality of the optical modulation element holders and the other members. Consequently, the operation of tubing the fluid circulation members can be easily carried out.

Furthermore, the optical device is reduced in size, thereby making it possible to reduce the impact of external force, so that the mutual positions of the plurality of the optical modulation elements are maintained in good condition, which can form a favorable optical image having no pixel deviation.

The optical device manufacturing method of exemplary embodiments is an optical device manufacturing method for manufacturing an optical device including: a light source; an optical modulation element to modulate a luminous flux emitted from the light source in response to image information to form an optical image; an optical modulation element holder that is formed with cooling chambers having cooling fluid sealed in an interior and that holds the optical modulation element so as to be able to transfer heat to the cooling fluid within the cooling chambers; a plurality of fluid circulation members that are connected in communication to the cooling chambers of the optical modulation element holder and that guide the cooling fluid to an exterior of the cooling chambers and lead the cooling fluid again into an interior of the cooling chambers, the optical device including a cooling fluid relay section disposed at a predetermined position relative to the optical axis of the luminous flux emitted from the light source and that relays, via the plurality of fluid circulation members, cooling fluid moving from the exterior to the interior of the cooling chambers of the optical modulation element holder and/or cooling fluid moving from the interior to the exterior of the cooling chambers of the optical modulation element holder, the plurality of fluid circulation members including at least two fluid circulation members that each have one-side end connected in communication to the cooling chambers are formed so that another-side end protrudes in the optical axis direction of the luminous flux emitted from the light source, and the cooling fluid relay section defining insertion holes that extend inwardly through the cooling fluid relay section and that are capable of receiving therethrough the another-side end of the at least two fluid circulation members, the method of manufacturing the optical device including: holding the optical modulation device on the optical modulation element holder; inserting the another-side end of the at least two fluid circulation members connected to the optical modulation element through the insertion holes of the cooling fluid relay section; introducing a luminous flux into the optical modulation element; modifying the insertion condition of the at least two fluid circulation members through the insertion holes based on the luminous flux that is introduced into the optical modulation element and made emergent from the optical modulation element, positionally adjusting the optical modulation element into a predetermined position on the optical axis of the luminous flux emitted from the light source; and fixing the at least two fluid circulation members into the insertion holes and sealing clearances between the insertion holes and the at least two fluid circulation members.

In exemplary embodiments, the optical device manufacturing method includes an optical modulation device assembly step, an optical modulation device placement step, a luminous flux introduction step, a positional adjustment step, and a position fixation step. Thereby, at the positional adjustment step, the optical modulation element can be easily positioned in a predetermined position on the optical axis of the luminous flux emitted from the light source, without bending the fluid circulation members connected to the optical modulation element holder. At the position fixation step, the optical modulation element holder being positionally fixed with respect to the cooling fluid relay section. At the same time, the clearances between the insertion holes and the at least two fluid circulation members are sealed. Therefore, the optical modulation element can be positionally fixed at a predetermined position, and it is possible to manufacture the favorable optical device having virtually no leakage of cooling fluid from the connections between the insertion holes of the cooling fluid relay section and the fluid circulation members.

In the optical device manufacturing method of exemplary embodiments, preferably, the optical device manufacturing method further includes: causing an optical image detection device to detect the luminous flux introduced and made emergent from the optical modulation element without sealing the cooling fluid inside the cooling chambers, plurality of fluid circulation members, and cooling fluid relay section of the optical modulation element holder, modifying the insertion condition of the another side end based on an optical image detected by the optical image detection device, with the optical image detection device deviated in a direction along the optical axis by an amount equivalent to the difference in length of the optical path of a luminous flux passing through the cooling chambers when the cooling fluid is not sealed in the cooling chambers of the optical modulation element holder and the optical path of a luminous flux passing through the cooling chambers when the cooling fluid is sealed in the cooling chambers of the optical modulation element holder.

In exemplary embodiments, the optical device manufacturing method is carried out without being filled with cooling fluid. The optical device manufacturing method includes an optical image detection step. The positional adjustment step carries out the positional adjustment of the optical modulation element, based on an optical image detected by the optical image detection device, with the optical image detection device deviated in a direction along the optical axis by an amount equivalent to the difference in length of an optical path passing through cooling fluid within the cooling chambers filled with cooling fluid and with respect to an optical path passing through air within the cooling chambers filled with no cooling fluid. Thereby, even when the optical device is manufactured without being filled with cooling fluid, the optical device can be positioned in an optimum position. Accordingly, there is no need to adjust the position of the optical modulation element holder again after the optical device is manufactured and cooling fluid fills the insides of the cooling chambers, plurality of fluid circulation members, and cooling fluid relay section of the optical modulation element holder.

The projector of exemplary embodiments include a light source device, the optical device described above, and a projection optical device to magnify and project an optical image formed by the optical device.

According to exemplary embodiments, the projector includes a light source device, the optical device described above, and a projection optical device, so that the projector can enjoy the same working-effects as the optical device described above.

The projector includes the optical device capable of favorably positioning the optical modulation element in a predetermined position. Therefore, the optical modulation element is virtually never deviated in position with respect to the optical axis of a luminous flux emitted from the light source device, so that undesired light is virtually never projected onto the screen.

BRIEF DESCRIPTION OF THE DRAWINGS

FIG. 10 is a perspective view showing the structure of a polarization plate fixing member of a second exemplary embodiment;

DETAILED DESCRIPTION OF EMBODIMENTS

First Exemplary Embodiment

A first exemplary embodiment of the invention will hereinafter be described with reference to the drawings.

Figure 1:
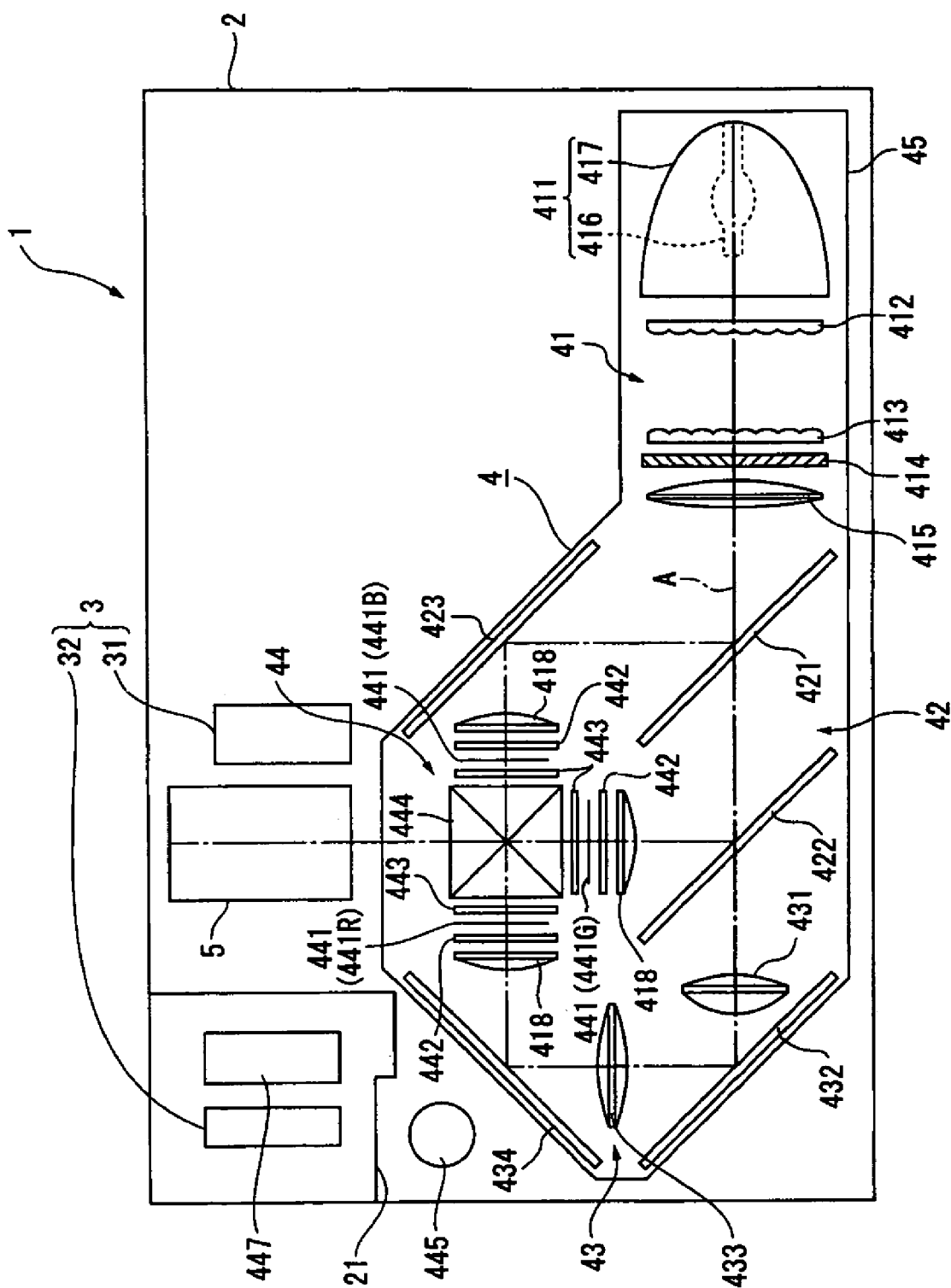
FIG. 1 is a schematic showing an outline configuration of a projector of a first exemplary embodiment.

FIG. 1 is a schematic showing an outline configuration of a projector 1.

A projector 1 modulates a luminous flux emitted from a light source in response to image information to form an optical image and magnifies and projects the formed image onto a screen. The projector 1 includes an exterior casing 2, a cooling unit 3, an optical unit 4, and a projection lens 5 serving as the projection optical device.

In FIG. 1, a power supply block, (not shown), a lamp drive circuit (not shown), and the like are disposed in a space within the exterior casing 2 exclusive of the cooling unit 3, optical unit 4, and projection lens 5.

The exterior casing 2, configured from a synthetic resin or the like, is formed into an overall substantially rectangular parallelepiped shape having housed and disposed inside thereof the cooling unit 3, optical unit 4, and projection lens 5. This exterior casing 2 includes an upper casing and a lower casing, which are omitted from the illustration. The upper casing includes the top, front, back, and side surfaces of the projector 1, and the lower casing includes the bottom, front, side, and back surfaces of the projector 1. The upper casing and the lower casing are fixed together by a screw or the like.

The exterior casing 2 may be formed from not only a synthetic resin but also another material, for example, a metal.

The exterior casing 2 is formed with an inlet (not shown) and an outlet (not shown). The inlet is for introducing cooling air from the exterior to the interior of the projector 1 through the cooling unit 3, and the outlet is for discharging air warmed inside the projector 1.

As shown in FIG. 1, the exterior casing 2 is formed with a partition wall 21 being located lateral to the projection lens 5 and in a corner portion of the exterior casing 2 and separating a radiator of the optical device of the optical unit 4 from the other members.

The cooling unit 3 sends cooling air into a cooling flow path formed inside the projector 1 and thus cools heat generated within the projector 1. The cooling unit 3 includes a sirocco fan 31 positioned lateral to the projection lens 5 and an axial fan 32 that serves as a cooling fan and is positioned inside the partition wall 21 formed in the exterior casing 2. The sirocco fan 31 introduces cooling air from the exterior of the projector 1 into the interior thereof from the inlet formed in the exterior casing 2 and thus blows the cooling air against a liquid crystal panel of the optical device of the optical unit 4. The axial fan 32 introduces cooling air from the exterior of the projector 1 into the interior thereof from the inlet (not shown) formed in the exterior casing 2 and thus blows the cooling air against the radiator of the optical unit 4.

In addition to the sirocco fan 31 and axial fan 32, the cooling unit 3 also has a cooling fan for cooling the optical device of the optical unit 4, a power supply block, a lamp drive circuit, and the like.

The optical unit 4 is a unit for optically processing the luminous flux emitted from the light source to form an optical image (color image) in response to image information. As shown in FIG. 1, this optical unit 4 has a substantially L-shape in plan view that extends along the back surface of the exterior casing 2 and also along a side surface thereof. The detailed configuration of this optical unit 4 will be described later.

The projection lens 5 is configured as a combined lens obtained by combining a plurality of lenses. The projection lens 5 magnifies and projects the optical image (color image) formed by the optical unit 4 onto the screen (not shown).

Exemplary Embodiments of the Optical Unit

As shown in FIG. 1, the optical unit 4 includes an integrator illumination optical system 41, a color separation optical system 42, a relay optical system 43, an optical device 44 and an optical component housing 45 having housed and disposed therein the optical components 41 to 43 and a an optical device main body 4404 of the optical device 44.

The integrator illumination optical system 41 is an optical system for substantially uniformly illuminating an image formation region of the liquid crystal panel configuring the optical device 44. As shown in FIG. 1, the integrator illumination optical system 41 includes a light source device 411, a first lens array 412, a second lens array 413, a polarization conversion element 414, and a superimposed lens 415.

The light source device 411 includes a light source lamp 416 for emitting a radial beam and a reflector 417 for reflecting the radiant light emitted from the light source lamp 416. The light source lamp 416 frequently uses a tungsten halogen lamp, a metal halide lamp, and/or a high pressure mercury-vapor lamp. The reflector 417 may adopt a paraboloidal mirror in FIG. 1. Alternatively, the reflector 417 may be configured with an ellipsoidal mirror and adopt on its luminous flux emergent side a parallelization concave lens for making a luminous flux reflected off the ellipsoidal mirror into a parallel beam.

The first lens array 412 has a configuration such that small lenses having a substantially rectangular contour as seen from an optical axis direction are arrayed in matrix fashion. The small lenses divide the luminous flux emitted from the light source device 411 into a plurality of partial luminous fluxes.

The second lens array 413 has substantially the same configuration as the first lens array 412 and thus has a configuration such that small lenses are arrayed in matrix fashion. Together with the superimposed lens 415, the second lens array 413 has the function of focusing images of the small lenses of the first lens array 412 onto the liquid crystal panel of the optical device 44.

The polarization conversion element 414, disposed between the second lens array 413 and the superimposed lens 415, converts lights from the second lens array 413 into substantially one-kind polarization lights.

Specifically, the partial lights converted into the substantially one-kind polarization lights by the polarization conversion element 414 are substantially superimposed by the superimposed lens 415 onto the liquid crystal panel of the optical device 44. A projector using a liquid crystal panel of the type to modulate polarization light can utilize only one-kind polarization light and therefore cannot utilize substantially half the light from the light source device 411 for emitting random polarization light. Consequently, by using the polarization conversion element 414, light emitted from the light source device 411 is converted into substantially one-kind polarization light, thus enhancing the usability of light in the optical device 44.

As shown in FIG. 1, the color separation optical system 42 includes two dichroic mirrors 421 and 422 and a reflecting mirror 423. The color separation optical system 42 separates a plurality of partial luminous fluxes, emitted from the integrator illumination optical system 41 by the dichroic mirrors 421 and 422, into color lights of three colors: red, green, and blue.

As shown in FIG. 1, the relay optical system 43 includes an incident side lens 431, a relay lens 433, and reflecting mirrors 432 and 434. The relay optical system 43 has the function of leading the red light separated by the color separation optical system 42 to a red light liquid crystal panel of the optical device 44.

On this occasion, the dichroic mirror 421 of the color separation optical system 42 reflects the blue light component of the luminous fluxes emitted from the integrator illumination optical system 41, while transmitting the red light component and green light component thereof. The blue light reflected by the dichroic mirror 421 reflects off the reflecting mirror 423, passes through a field lens 418, and then reaches a blue light liquid crystal panel of the optical device 44. The field lens 418 converts the partial lights emergent from the second lens array 413 into luminous fluxes parallel to their central axis (principal ray). The field lenses 418 disposed on the light incident sides of the green light and red light liquid crystal panels are similar to the field lens 418.

Out of the red and green lights transmitted through the dichroic mirror 421, the green light reflects off the dichroic mirror 422, passes through the field lens 418, and then reaches the green light liquid crystal panel of the optical device 44. The red light transmits through the dichroic mirror 422, passes through the relay optical system 43 and further through the field lens 418, and then reaches the red light liquid crystal panel of the optical device 44. The reason for using the relay optical system 43 for the red light is to prevent light usability from lowering due to light divergence or the like since the optical path of the red light is larger in length than those of the other color lights. That is, the reason is to transfer partial luminous fluxes incident on the incident side lens 431 as-is to the field lens 418. This exemplary embodiment may adopt such a configuration since the optical path of the red light is larger in length; however, other exemplary embodiments may adopt another configuration such that the optical path of the blue light is set larger in length.

As shown in FIG. 1, the optical device 44 is obtained by integrally forming: the three liquid crystal panels 441 (the red light liquid crystal panel is indicated by 441R, the green light liquid crystal panel by 441G, and the blue light liquid crystal panel by 441B) serving as the optical modulation elements; an incident side polarization plate 442 and an emergent side polarization plate 443 that, serving as the optical modulation elements, are disposed on the luminous flux incident and emergent sides of each of the liquid crystal panels 441; and a cross dichroic prism 444 serving as the color combination optical device.

In addition to the liquid crystal panels 441, the incident side polarization plates 442, and the emergent side polarization plates 443, and the optical device 444, the optical device 44 includes a main tank, a fluid pumping section, a cooling fluid relay section, an optical modulation element holder, the radiator, and fluid circulation members.

The liquid crystal panels 441 have a configuration such that a liquid crystal of electro-optic material is hermetically sealed between a pair of substrates 441C and 441D (see FIG. 6) made of glass or the like. Out of these substrates, the substrate 441C (see FIG. 6) is a drive substrate for driving the liquid crystal. The substrate 441 C has a plurality of data lines arrayed and formed parallel to each other, a plurality of scanning lines arrayed and formed in a direction perpendicular to the plurality of data lines, pixel electrodes arrayed and formed in matrix fashion in response to the intersections of the scanning lines and the data lines, and a switching element such as a TFT. The substrate 441D (see FIG. 6) is an opposite substrate that is oppositely spaced a predetermined distance away from the substrate 441C, and has a common electrode to which a predetermined voltage Vcom is applied. A control device (not shown) makes electrical connection with the substrates 441C and 441D, and a flexible printed board 441E (see FIG. 6) for outputting a predetermined drive signal to the common electrode and the like is connected to the substrates 441C and 441D. A drive signal is inputted from the control device via this flexible printed board 441 E (see FIG. 6), thereby applying a predetermined voltage between the pixel electrode and the common electrode. The orientation of the liquid crystal interposed between the pixel electrode and the common electrode is controlled to modulate the polarization direction of a polarized luminous flux emergent from the incident side polarization plate 442.

The color lights whose polarization directions are oriented in substantially the same direction by the polarization conversion element 414 are made incident on the incident side polarization plate 442. Out of the incident luminous fluxes, the incident side polarization plate 442 transmits only a polarized light having substantially the same direction as the polarization axis of the luminous flux thus oriented by the polarization conversion element 414, while absorbing the other luminous fluxes. The incident side polarization plate 442 has a configuration such that a viewing angle correction film (not shown) and polarization film, serving as the optical conversion films, adhere on a light-transmissive substrate 442A (see FIG. 6) made of, for example, sapphire glass or berg crystal.

Out of the luminous fluxes emergent from the liquid crystal panels 441, the emergent side polarization plate 443 transmits only a polarized light having a polarization axis perpendicular to the transmission axis of the luminous flux of the incident side polarization plate 442, while absorbing the other luminous fluxes. Similar to the incident side polarization plate 442, the emergent side polarization plate 443 has a configuration such that a viewing angle correction film (not shown) and polarization film 443B (see FIG. 6) adhere on a light-transmissive substrate 443A (see FIG. 6).

The viewing angle correction film has the function of modifying the viewing angle of an optical image formed in the crystal panel 441. The viewing angle correction film is disposed, thereby widening the viewing angle of the projection images and improving the contrast of the projection images.

The cross dichroic prism 444 is an optical element to combine optical images modulated in each color light emergent from the emergent side polarization plate 443 to form a color image. The cross dichroic prism 444 is obtained by adhering four right angle prisms to form a substantially square shape in plan view. The interfaces obtained by adhering the right angle prisms together are formed with two dielectric multilayer films. The dielectric multilayer films reflect the color lights that emerge from the liquid crystal panels 441R and 441B and that travels through the emergent side polarization plate 443, while transmitting the color light that emerges from the liquid crystal panel 441G and travels through the emergent side polarization plate 443. By thus doing, the color lights modulated in the liquid crystal panels 441R, 441C, and 441B are combined to form a color image.

The optical component housing 45 is configured from a metallic member for example. As shown in FIG. 1, a predetermined illumination optical axis A is set inside the optical component housing 45, wherein the optical components 41 to 43 and the optical device main body of the optical device 44 are housed and disposed at predetermined positions respective to the illumination optical axis A. The optical component housing 45 may be configured not only from the metallic member but also from any other material having heat conductance. This optical component housing 45 includes the optical components 41 to 43, a container-like component housing member for housing the optical device main body of the optical device 44, and a lid-like member for closing the opening portion of the component housing member.

Out of these members, the component housing member includes the bottom, front, and side surfaces of the optical component housing 45.

Three holes (not shown) are formed in the bottom surface of the component housing member corresponding to the positions of the liquid crystal panels 441 of the optical device 44. Cooling air introduced from the exterior into the interior of the projector 1 by the sirocco fan 31 of the cooling unit 3 is ejected from the sirocco fan 31 and thus circulates to the three liquid crystal panels 441 of the optical device 44 via the three holes.

Exemplary Embodiments of the Optical Device

Figure 2:
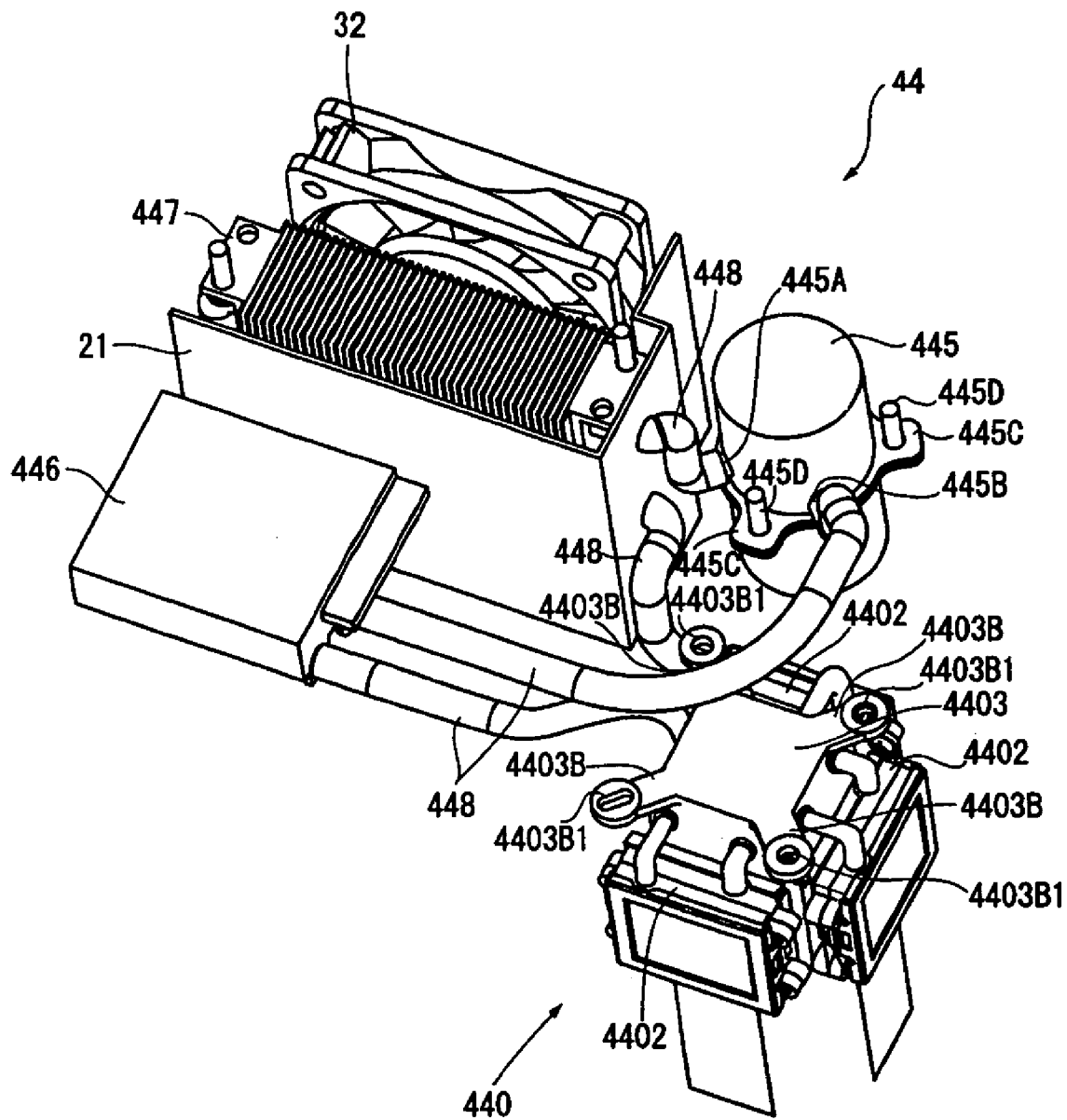
FIG. 2 is a perspective view of an optical device of the first exemplary embodiment as viewed from below.

FIG. 2 is a perspective view of the optical device 44 as viewed from below.

As shown in FIG. 2, the optical device 44 includes the liquid crystal panels 441, incident side polarization plates 442, emergent side polarization plates 443, optical device main body 440 integrally formed with the cross dichroic prism 444, main tank 445, fluid pumping section 446, radiator 447, and plural fluid circulation members 448.

The plural fluid circulation members 448 are each configured of a tubular member made of aluminum so that cooling fluid can convectively circulate inside thereof, thus providing connections between the members 440 and 445 to 447 so that cooling fluid can circulate therewithin. The circulating cooling fluid cools heat generated in the liquid crystal panels 441, incident side polarization plates 442, and the emergent side polarization plates 443 that configure the optical device main body 440.

This exemplary embodiment adopts ethylene glycol of a transparent non-volatile liquid as a cooling fluid. The cooling fluid adopts not only ethylene glycol but also any other liquid.

The members 440 and 445 to 447 will hereinafter be sequentially described along the flow path of circulating cooling fluid, starting from the upstream side of the liquid crystal panels 441.

Exemplary Embodiments of the Main Tank

Figure 3A:
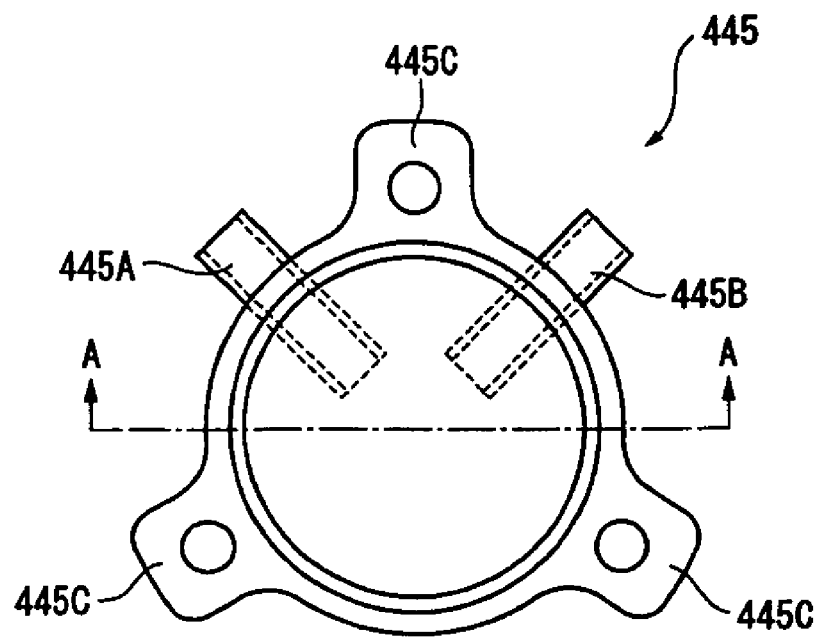
FIGS. 3(A) and 3(B) are schematics showing the structure of a main tank of the first exemplary embodiment.
Figure 3B:
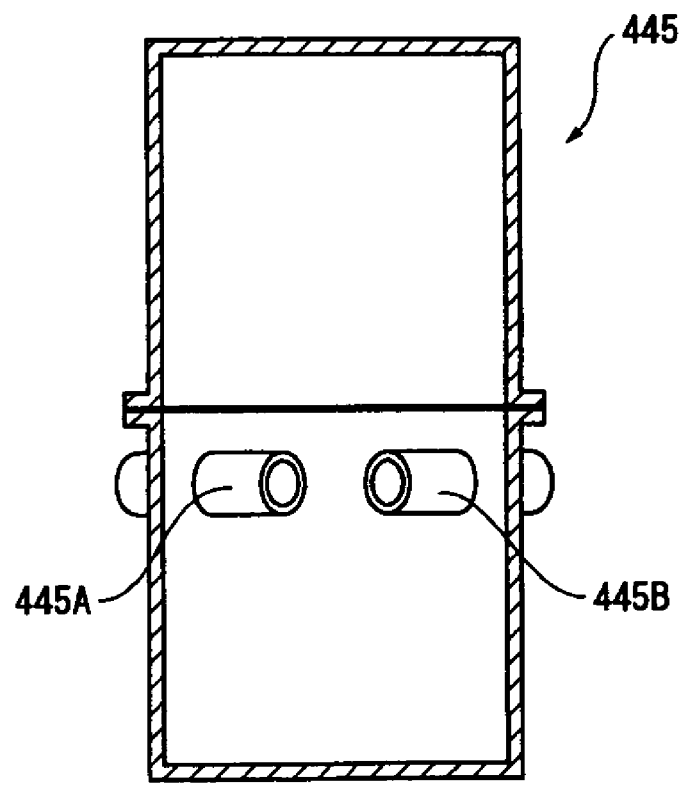

FIGS. 3(A) and 3(B) are views showing the structure of the main tank 445. Specifically, FIG. 3(A) is a plan view of the main tank 445 as seen from above. FIG. 3(B) is a sectional view taken along line A—A of FIG. 3(A).

The main tank 445, having a substantially cylindrical shape, includes two container-like members made of aluminum. The opening portions of the two container-like members are connected to each other, thereby temporarily storing cooling fluid inside thereof. The container-like members are connected together, for example, by seal welding or by interposing an elastic member such as rubber therebetween.

In the main tank 445, a cooling fluid inflow portion 445A to allow cooling fluid to flow into the interior of the tank and a cooling fluid outflow portion 445B to allow cooling fluid inside to flow to the exterior of the tank are formed in a substantially central portion thereof in a cylindrical axis direction as shown in FIG. 3(B).

The cooling fluid inflow portion 445A and cooling fluid outflow portion 445B, configured from a substantially cylindrical member having a smaller tube diameter dimension than the fluid circulation members 448, are disposed so as to protrude inwardly and outwardly of the main tank 445. One of the ends of the fluid circulation members 448 is connected to one outwardly protruding end of the cooling fluid inflow portion 445A, so that cooling fluid from exterior of the main tank 445 flows into the interior thereof via the fluid circulation member 448. Another one of the ends of the fluid circulation members 448 is connected to one outwardly protruding end of the cooling fluid outflow portion 445B, so that cooling fluid inside of the main tank 445 flows to the exterior thereof via the fluid circulation member 448.

As shown in FIG. 3(A), the cooling fluid inflow portion 445A and cooling fluid outflow portion 445B are disposed so that the other inwardly protruding ends thereof extend toward the cylindrical axis of the main tank 445 and are substantially perpendicular to each other as seen in top plan. With such a configuration, cooling fluid flowing into the interior of the main tank 445 via the cooling fluid inflow portion 445A may be prevented from flowing directly to the exterior thereof via the cooling fluid outflow portion 445B, so that inflowing cooling fluid is mixed with cooling fluid inside of the main tank 445, thus generally uniformizing the temperature of cooling fluid.

As shown in FIG. 3(A), the two container-like members each have three fixing portions 445C formed in a substantially central portion of the outer periphery of the main tank 445 in the cylindrical axis direction of the main tank 445. Screws 445D (see FIG. 2) are inserted through the fixing portions 445C and screwed into the bottom surface of the exterior casing 2. Thereby, the two container-like members are tightly connected to each other, and the main tank 445 is fixed to the exterior casing 2.

As shown in FIG. 1, the main tank 445 is disposed in a region of triangular shape in plan view formed by the optical component housing 45 and the inner surface of the exterior casing 2. The main tank 445 is disposed in this region, thereby improving housing efficiency within the exterior casing 2, so that the projector 1 does not need to increase in size.

Exemplary Embodiments of Fluid Pumping Section

The fluid pumping section 446 feeds in cooling fluid accumulated within the main tank 445 and forcibly feeds the fed-in cooling fluid to the exterior. Consequently, as shown in FIG. 2, the fluid pumping section 446 is connected in communication to the other end of the fluid circulation member 448 connected to the cooling fluid outflow portion 445B of the main tank 445, and is connected in communication to one end of another fluid circulation member 448 in order to feed cooling fluid to the exterior.

This fluid pumping section 446 has a configuration such that an impeller is disposed in, for example, a substantially rectangular parallelepiped hollow member made of aluminum. Under control of the control device (not shown), the impeller rotates, whereby cooling fluid accumulated within the main tank 445 is forcibly fed in via the fluid circulation members 448, and the fed-in cooling fluid is forcibly fed to the exterior via the fluid circulation members 448. With such a configuration, the thickness dimension of the fluid pumping section 446 in the direction of the rotational axis of the aforesaid impeller can be reduced, thus making it possible to dispose the fluid pumping section 446 in an empty space inside the projector 1. In this embodiment, the fluid pumping section 446 is disposed below the projection lens 5.

Exemplary Embodiments of the Optical Device Main Body

Figure 4:
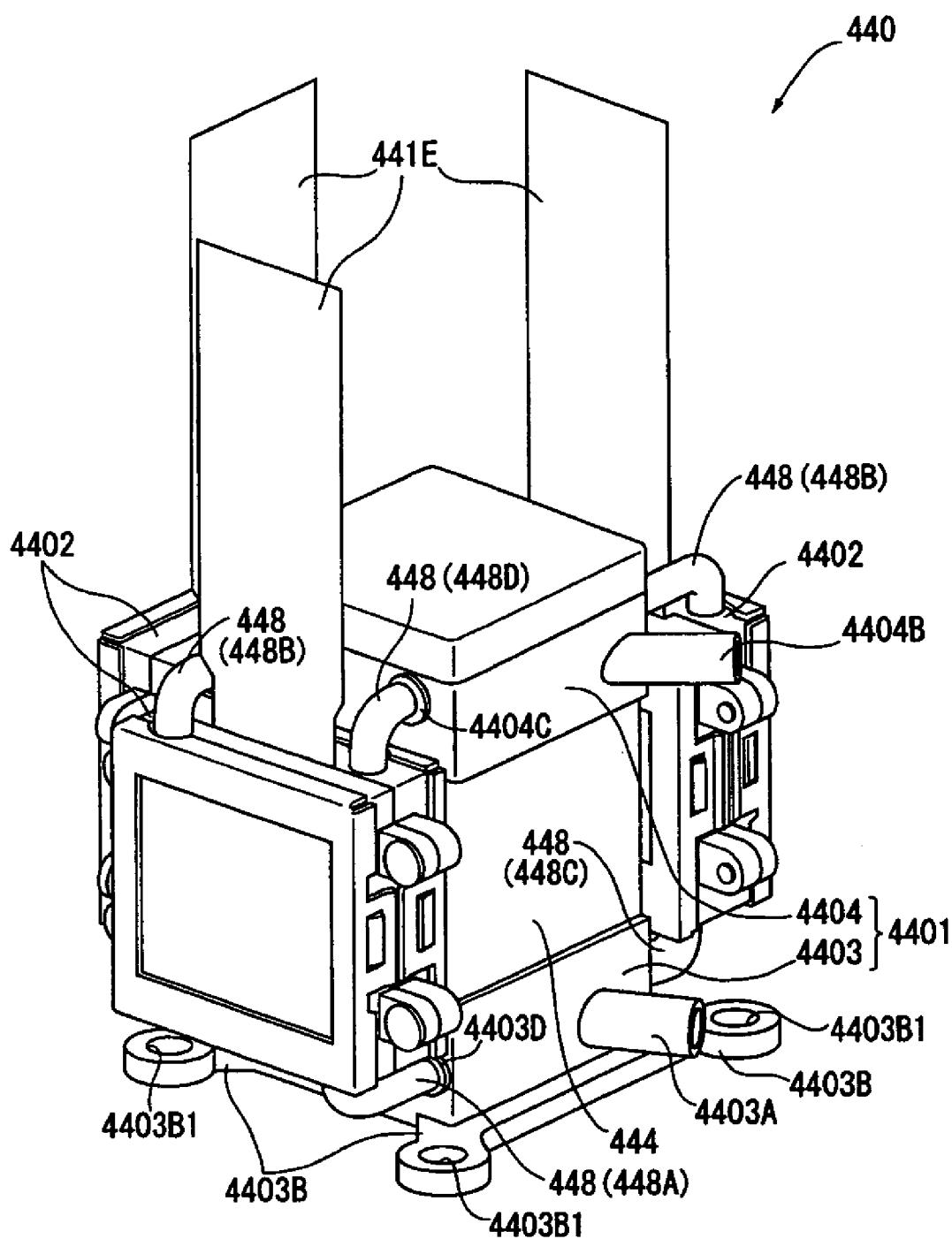
FIG. 4 is a perspective view showing an outline configuration of an optical device main body of the first exemplary embodiment.

FIG. 4 is a perspective view showing the outline configuration of the optical device main body 440.

Figure 5:
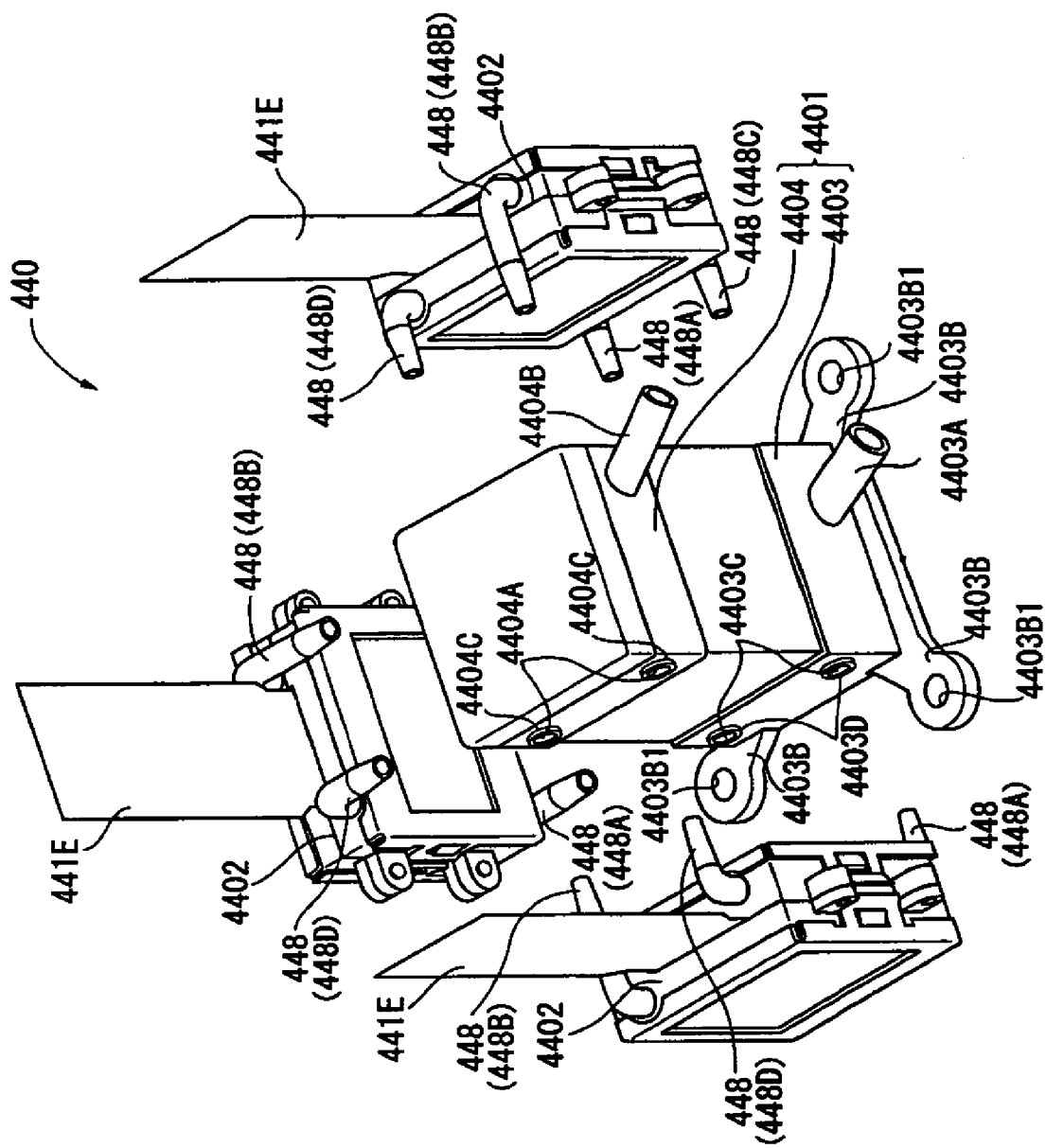
FIG. 5 is an exploded perspective view showing an outline configuration of the optical device main body of the first exemplary embodiment.

FIG. 5 is an exploded perspective view showing the outline configuration of the optical device main body 440.

The optical device main body 440 includes a cooling fluid relay section 4401 and three optical modulation element holders 4402 as shown in FIG. 4 or 5, in addition to three liquid crystal panels 441, three incident side polarization plates 442, three emergent side polarization plates 443, and cross dichroic prism 444.

The cooling fluid relay section 4401, configured of a hollow member made of aluminum, relays cooling fluid moving from the exterior to the interior of the optical modulation element holders 4402 and relays cooling fluid moving from the interior to the exterior of the optical modulation element holders 4402. As shown in FIG. 4 or 5, the cooling fluid relay section 4401 includes a first relay section 4403 and a second relay section 4404.

Exemplary Embodiments of the First Relay Section

The first relay section 4403, configured of a substantially rectangular parallelepiped hollow member made of aluminum, feeds in cooling fluid forcibly fed out from the fluid pumping section 446. The first relay section 4403 divides the fed-in cooling fluid into three branches and feeds out the cooling fluid into the three optical modulation element holders 4402. The first relay section 4403 is fixed to the lower surface of the cross dichroic prism 444, that has an end face intersecting the three luminous flux incident side end faces, and also serves as a prism fixing plate for supporting the cross dichroic prism 444.

As shown in FIG. 4 or 5, a cooling fluid inflow portion 4403A to allow cooling fluid pumped from the fluid pumping section 446 to flow into the interior thereof is formed in a side surface of the cross dichroic prism 444 corresponding to a luminous flux emergent side end face of the first relay section 4403. Similar to the cooling fluid inflow portion 445A of the main tank 445, the cooling fluid inflow portion 4403A, configured from a substantially cylindrical member having a smaller tube diameter dimension than the cooling fluid circulation members 448, is disposed so as to protrude inwardly and outwardly of the first relay section 4403. An end of the fluid circulation member 448 opposite the end thereof connected in communication to the fluid pumping section 446 is connected to one outwardly protruding end of the cooling fluid inflow portion 4403A, so that the cooling fluid pumped from the fluid pumping section 446 flows into the interior of the first relay section 4403 via the fluid circulation member 448.

As shown in FIGS. 2 and 4 or 5, arms 4403B extend along the bottom surface of the first relay section 4403 and are formed at four corner portions of the bottom surface. Holes 4403B1 are defined in the leading end portions of the arms 4403B. Screws (not shown) are inserted through the holes 4403B1 and screwed into the bottom surface of the optical component housing 45, thereby fixing the optical device main body 440 to the optical component housing 45. The first relay section 4403 is thus connected to the optical component housing 45 so as to be able to transfer heat therebetween, thereby securing a heat transfer path from circulating cooling fluid through the first relay section 4403 to the optical component housing 45. This improves the cooling fluid's cooling efficiency and furthermore improves cooling fluid's cooling efficiency in the liquid crystal panels 441, incident side polarization plate 442, and emergent side polarization plate 443. Air supplied from the sirocco fan 31 is caused to flow along the bottom surface of the optical component housing 45, thereby enabling an increase in heat radiating area of the circulating cooling fluid and further enhancing cooling efficiency.

As shown in FIG. 5, insertion holes 4403C positioned on both left and right end sides are defined in each of the three side surfaces of the first relay section 4403 corresponding to the luminous flux incident side end faces of the cross dichroic prism 444. The insertion holes 4403C are capable of receiving therethrough the two fluid circulation members connected in communication to the optical modulation element holder 4402. The insertion holes 4403C are formed to have a diameter that is slightly larger than the outer peripheral dimension of the fluid circulation members. With the optical device main body 440 assembled, as shown in FIG. 4 or 5, the clearances between the insertion holes 4403C and the fluid circulation members are sealed with sealing rings 4403D.

FIG. 5 illustrates an exemplary embodiment of the insertion holes 4403C formed in the side surface on the B color light side but, actually, two insertion holes are also formed in the side surface on each of the R and G color light sides. That is, a total of six insertion holes 4403C are formed in the first relay section 4403.

The two fluid circulation members connected in communication to the optical modulation element holder 4402 are inserted through the insertion holes 4403C. Thereby, cooling fluid within the first relay section 4403 is branched and flows out via the fluid circulation members and circulates to the optical modulation holder 4402.

In this first relay section 4403, a ball-like bulge (not shown) is formed in a substantially central portion of the upper surface. The lower surface of the cross dichroic prism 444 is abutted against the bulge, thereby enabling positional adjustment of the cross dichroic prism 444 in a tilt direction with respect to the first relay section 4403.

Exemplary Embodiments of the Optical Modulation Element Holder

The three optical modulation element holders 4402 hold the three liquid crystal panels 441, three incident side polarization plates 442, and three emergent side polarization plates 443, respectively. The three optical modulation element holders 4402 allow cooling fluid to flow in and out from their interior, thus causing the cooling fluid to cool the three liquid crystal panels 441, three incident side polarization plates 442, and three emergent side polarization plates 443. Because the optical modulation element holders 4402 have the same configuration, only one optical modulation element holder 4402 will be described below.

Figure 6:
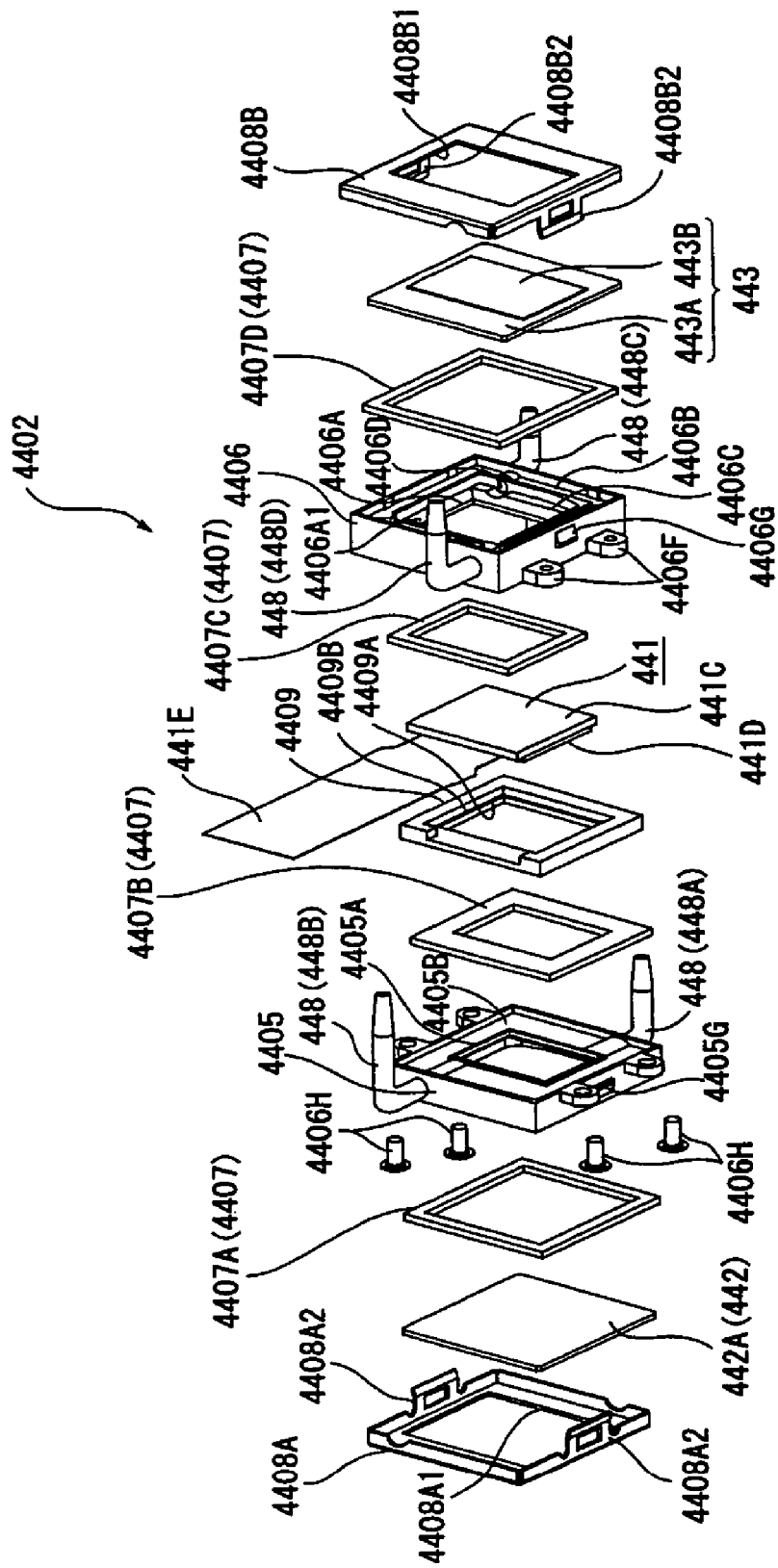
FIG. 6 is an exploded perspective view showing an outline configuration of an optical modulation element holder of the first exemplary embodiment.

FIG. 6 is an exemplary embodiment of an exploded perspective view showing the outline configuration of the optical modulation element holder 4402.

As shown in FIG. 6, the optical modulation element holder 4402 includes a pair of frame-like members 4405 and 4406, four elastic members 4407, a pair of polarization plate fixing members 4408A and 4408B serving as the light-transmissive substrate pressing members, and a support frame 4409.

The frame-like member 4405 is an aluminum frame of substantially rectangular shape in plan view that has in a substantially central portion thereof a rectangular opening 4405A corresponding to the image formation region of the liquid crystal panel 441. The frame-like member 4405, disposed on the luminous flux incident side with respect to the frame-like member 4406, supports the luminous flux incident side end face of the liquid crystal panel 441 and also supports the luminous flux emergent side end face of the incident side polarization plate 442.

Figure 7:
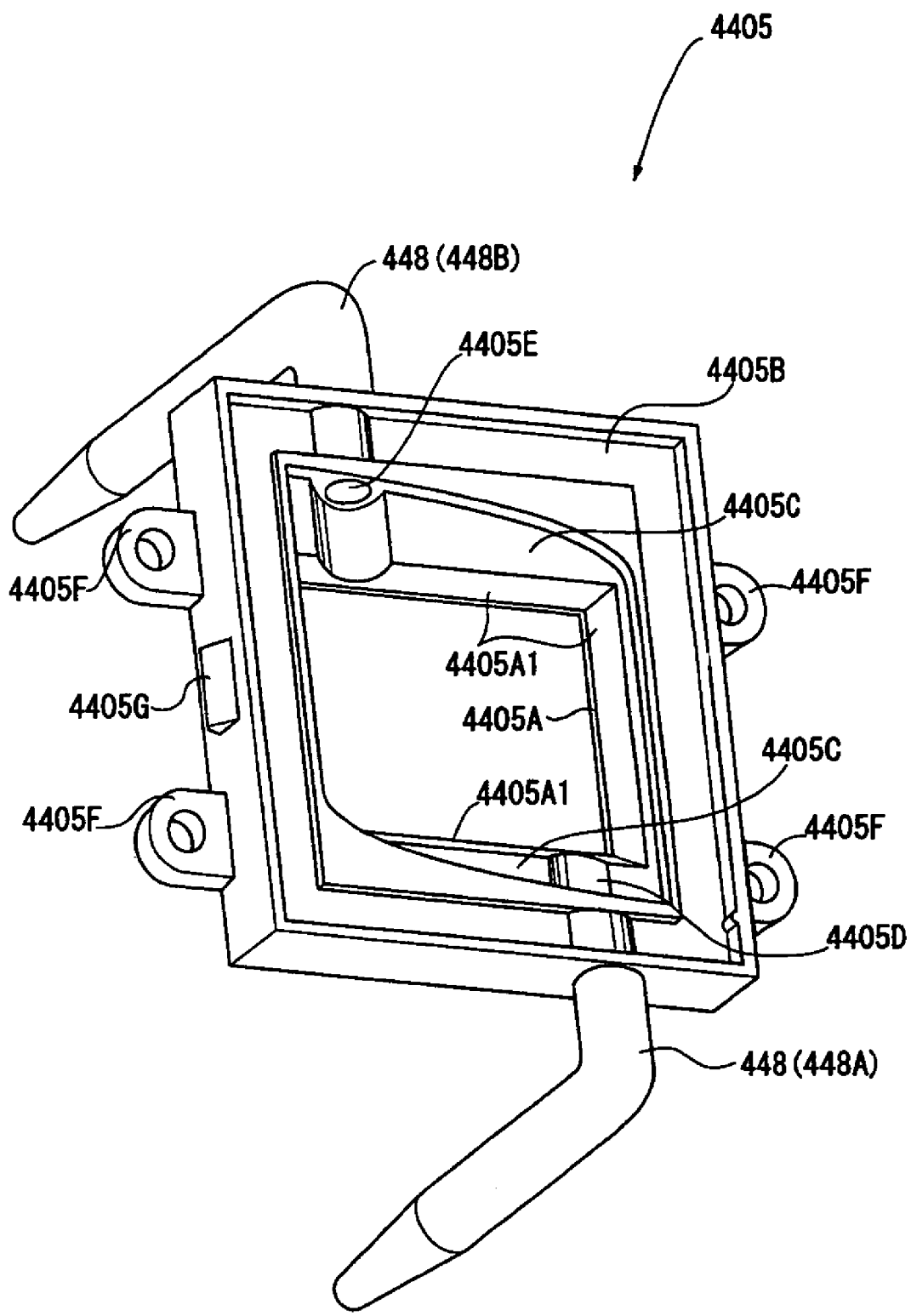
FIG. 7 is a perspective view of a frame-like member of the first exemplary embodiment as viewed from a luminous flux incident side.

FIG. 7 is an exemplary embodiment of a perspective view of the frame-like member 4405 as viewed from the luminous flux incident side.

As shown in FIG. 7, a rectangular frame-like recess 4405B is formed in the luminous flux incident side end face of the frame-like member 4405 to receive the shape of a first elastic member of the elastic member 4407. The incident side polarization plate 442 is supported in the recess 4405B via the first elastic member. The frame-like member 4405 supports the luminous flux emergent side end face of the incident side polarization plate 442, whereby the first elastic member and the luminous flux emergent side end face of the incident side polarization plate 442 close the luminous flux incident side of the opening 4405A.

As shown in FIG. 7, an edge portion of the periphery of the opening 4405A on the luminous flux incident side is chamfered to have a slant face 4405A1 so that an opening area increases toward the luminous flux incident side end face away from the luminous emergent side end face.

As shown in FIG. 7, recesses 4405C having a larger depth dimension than the recess 4405B are formed in upper and lower end peripheries of the opening 4405A on the luminous flux incident side end face. Out of the recesses 4405C, an upper sidewall of the recess 4405C positioned above is formed into a curved surface shape so as to come closer to the opening 4405A toward the right and away from the left as viewed from the luminous flux incident side. A lower sidewall of the recess 4405C positioned below is formed into a curved surface shape so as to come closer to the opening 4405A toward the left and away from the right as viewed from the luminous flux incident side.

As shown in FIG. 6, similar to the luminous flux incident side end face of the frame-like member 4405, a rectangular frame-like recess 4405B is formed on the luminous flux emergent side end face to receive the shape of a second elastic member of the elastic member 4407. The luminous flux incident side end face of the liquid crystal panel 441 is supported in the recess 4405B via the second elastic member and support frame 4409. The frame-like member 4405 supports the luminous flux incident side end face of the liquid crystal panel 441, whereby the second elastic member, the support frame 4409, and the luminous flux incident side end face of the liquid crystal panel 441 close the luminous flux emergent side of the opening 4405A.

The liquid crystal panel 441 and the incident side polarization plate 442 close the luminous flux incident and emergent sides of the opening 4405A, thereby forming a cooling chamber capable of sealing cooling fluid inside of the frame-like member 4405.

In the frame-like member 4405, as shown in FIG. 7, an inflow port 4405D is formed on the right of the lower end thereof as seen from the luminous flux incident side. The inflow port 4405D passes through the lower sidewall of the recess 4405C positioned below and allows cooling fluid, which flows out from the insertion hole 4403C of the first relay section 4403, to flow into the interior. As shown in FIG. 7, one end of the fluid circulation member 448A is connected to the inflow port 4405D by welding for example. The fluid circulation member 448A is bent at substantially 90° with the other end thereof oriented toward the luminous flux emergent side, and the leading end portion of the other end is taperingly formed into a nozzle shape. To assemble the optical device main body 440, the leading end portion of the fluid circulation member 448A is inserted through the insertion hole 4403C of the first relay section 4403.

With such a configuration, when the optical device main body 440 is assembled, cooling fluid inside the first relay section 4403 flows via the fluid circulation member 448A into the cooling chamber inside the frame-like member 4405.

As shown in FIG. 7, an outflow port 4405E is formed on the left of the upper end of the frame-like member 4405 as viewed from the luminous flux incident side. The outflow port 4405E passes through the upper sidewall of the recess 4405C positioned above and allows cooling fluid inside the cooling chamber of the frame-like member 4405 to flow to the exterior. That is, the inflow port 4405D and outflow port 4405E are formed near diagonal positions of the frame-like member 4405 at the opposed side ends thereof. As shown in FIG. 7, one end of the fluid circulation member 448B, having the same shape as the fluid circulation member 448A connected to the inflow port 4405D, is connected to the outflow port 4405E by welding for example. Cooling fluid inside the cooling chamber of the frame-like member 4405 flows to the exterior via this fluid circulation member 448B.

As shown in FIG. 7, connections 4405F to connect the frame-like member 4406 are formed in corner portions of the frame-like member 4405 at the left ends thereof and in corner portions thereof at the right ends.

As shown in FIG. 6 or 7, hooks 4405G to be engaged with the polarization plate fixing plates 4408A are formed in a substantially central portion of the frame-like member 4405 at the left end thereof and in a substantially central portion thereof at the right end.

The frame-like member 4406, configured from an aluminum member, clamps the liquid crystal panel 441 with respect to the frame-like member 4405 via a third elastic member of the elastic member 4407. At the same time, the frame-like member 4406 supports the emergent side polarization plate 443, via a fourth elastic member of the elastic member 4407, on a surface of the frame-like member 4406 opposite the surface thereof opposed to the frame-like member 4405. The specific structure of the frame-like member 4406 is substantially the same as that of the frame-like member 4405. Specifically, the frame-like member 4406 is obtained by being rotated 180° around the axis passing through a substantially central portion of the frame-like member 4405 in the left and right direction thereof. That is, the frame-like member 4406 is formed with an opening 4406A (inclusive of a slant face 4406A1), recesses 4406B and 4406C, an inflow port 4406D, an outflow port (not shown), connections 4406F, and hooks 44060, which are similar to the opening 4405A (inclusive of the slant face 4405A1), recesses 4405B and 4405C, inflow port 4405D, outflow port 4405E, connections 4405F, and hooks 4405G of the frame-like member 4405.

Similar to the frame-like member 4405, the liquid crystal panel 441 and the emergent side polarization plate 443 close the luminous flux incident and emergent sides of the opening 4406A, thereby forming a cooling chamber capable of sealing cooling fluid inside of the frame-like member 4406.

One end of the fluid circulation member 448C, having the same shape as the fluid circulation member 448A connected to the inflow portion 4405D of the frame-like member 4405, is connected to the inflow portion 4406D by welding for example. To assemble the optical device main body 440, the leading end portion of another end of the fluid circulation member 448C is inserted through the insertion hole 4403C of the first relay section 4403. Thus, cooling fluid inside the first relay section 4403 flows via the fluid circulation member 448C into the cooling chamber inside the frame-like member 4406.

One end of the fluid circulation member 448D having the same shape as the fluid circulation member 448B connected to the outflow port 4405E of the frame-like member 4405 is connected to the outflow port (not shown) by welding for example. Cooling fluid inside the cooling chamber of the frame-like member 4406 flows to the exterior via the fluid circulation member 448D.

With such a configuration, the inflow port 4405D and outflow port 4405E of the frame-like member 4405 are projected on the frame-like member 4406 when the pair of frame-like members 4405 and 4406 are assembled. The inflow port 4405D and outflow port 4405E thus projected are disposed at positions of the frame-like member 4406 at the side ends thereof and opposite the outflow port (not shown) and inflow port 4406D thereof.

Screws 4406H are screwed into the connections 4405F and 4406F of the frame-like members 4405 and 4406. Thereby, the crystal panel 441 is clamped between the frame-like members 4405 and 4406 via the support frame 4409 and second and third elastic members of the elastic member 4407, thus sealing the opposed faces of the openings 4405A and 4406A of the frame-like member 4405 and 4406.

The elastic member 4407 includes the first elastic member 4407A interposed between the incident side polarization plate 442 and the frame-like member 4405, the second elastic member 4407B interposed between the frame-like member 4405 and the liquid crystal panel 441, the third elastic member 4407C interposed between the liquid crystal panel 441 and the frame-like member 4406, and the fourth elastic member 4407D interposed between the frame-like member 4406 and the emergent side polarization plate 443. The elastic members 4407 seal the cooling chambers of the frame-like members 4405 and 4406, thus preventing the leakage, etc. of cooling fluid. The elastic member 4407 is formed from silicon rubber having elasticity, and one or both surfaces thereof are surface-treated which increases surface cross-linking density. The elastic member 4407 can adopt, for example, Circon GR-d series (trademark of Fuji Polymer Co., Ltd.). The end face may be surface-treated, thereby making it possible to easily carry out the operation of disposing the elastic members 4407 in the recesses 4405B and 4406B of the frame-like members 4405 and 4406.

The elastic member 4407 may use butyl rubber, fluorocarbon rubber, or the like that has a low moisture permeation rate.

The support frame 4409, configured from an aluminum plate of rectangular shape in plan view, holds the liquid crystal panel 441 and positions the liquid crystal panel 441 in a predetermined position of each of the frame-like members 4405 and 4406.

In the support frame 4409, as shown in FIG. 6, a rectangular opening 4409A, capable of fitting therein the opposite substrate 441D of the liquid crystal panel 441, is formed in a substantially central portion thereof. The opposite substrate 441D of the liquid crystal panel 441 is fitted in the opening 4409A, thereby positioning the liquid crystal panel 441 with respect to the support frame 4409.

A shoulder 4409B for disposing the drive substrate 441C thereon in a loose-fitting state with the opposite substrate 441D fitted in the opening 4409A is formed on the periphery of the opening 4409A. The dimension between the shoulder 4409B and the luminous flux incident side end face of the support frame 4409 is set smaller than the thickness dimension of the opposite substrate 441D. When the opposite substrate 441D is fitted in the opening 4409A and the luminous flux incident side end face of the opposite substrate 441D is made substantially flush with the luminous flux incident side end face of the support frame 4409, a clearance is formed between the shoulder 4409B and the drive substrate 441C. The clearance is filled with a highly spreadable adhesive, thereby positioning and fixing the liquid crystal panel with respect to the support frame.

The upper side of the shoulder 4409B is formed to extend between the upper edges of the support frame 4409. With the liquid crystal panel 441 positionally fixed with respect to the support frame 4409, the flexible printed board 441E of the liquid crystal panel 441 is disposed on the upper side of the shoulder 4409B without being bent.

The polarization plate fixing members 4408A and 4408B press and fix the incident side polarization plate 442 and the emergent side polarization plate 443, via the first elastic member 4407A and fourth elastic member 4407D of the elastic member 4407, into the recess 4405B formed in the luminous flux incident side end face of the frame-like member 4405 and into the recess 4406B formed in the luminous flux emergent side end face of the frame-like member 4406. These polarization plate fixing members 4408A and 4408B are configured of frames of substantially rectangular shape in plan view that have openings 4408A1 and 4408B1 formed in the substantially central portions thereof. The polarization plate fixing members 4408A and 4408B press the incident side polarization plate 442 and the emergent side polarization plate 443, in the peripheral portions of the openings 4408A1 and 4408B1, against the frame-like members 4405 and 4406, respectively. Hook engagement portions 4408A2 and 4408B2 are formed in pairs on the left and right edges of each of these polarization plate fixing members 4408A and 4408B. Thus, the hook engagement portions 4408A2 and 4408B2 are engaged with the hooks 4405G and 4406G of the frame-like members 4405 and 4406. Thereby, fixation is established where the polarization plate fixing members 4408A and 4408B press the incident side polarization plate 442 and the emergent side polarization plate 443 against the frame-like members 4405 and 4406.

Exemplary Embodiments of the Structure of Second Relay Section

As shown in FIGS. 4 or 5, the second relay section 4404, configured of a substantially rectangular hollow member made of aluminum, is fixed to the upper surface of the cross dichroic prism 444 that is an end face of the cross dichroic prism 444 intersecting with the three luminous flux side end faces thereof. The second relay section 4404 collectively feeds in cooling fluid fed out from the optical modulation element holders 4402 and feeds the fed-in cooling fluid to the exterior.

As shown in FIG. 5, insertion holes 4404A are formed in each of three side surfaces of the second relay section 4404 corresponding to the three luminous flux incident side end faces of the cross dichroic prism 444. The insertion holes 4404A are positioned on both left and right end sides of each of the three side surfaces, and are capable of receiving therethrough the another ends of the two fluid circulation member 448B and 448D connected in communication to the optical modulation element holder 4402. Like the insertion holes 4403C of the first relay section 4403, the insertion holes 4404A are formed to have a slightly larger diameter than the outer peripheral dimension of the fluid circulation members 448B and 448D. With the optical device main body 440 assembled, as shown in FIG. 4 or 5, the clearances between the insertion holes 4404A and the fluid circulation members 448B and 448D are sealed with sealing rings 4404C.

FIG. 5 illustrates only the insertion holes 4404A formed in the side surface on the B color light side; however, two insertion holes are also formed in the side surface on each of the R and G color light sides. That is, a total of six insertion holes 4404A are formed in the second relay section 4404.

The another ends of the fluid circulation members 448B and 448D are inserted through the insertion holes 4404A, whereby cooling fluid flowing out from the cooling chambers inside the optical modulation element holders 4402 is collectively fed into the interior of the second relay section 4404 via the fluid circulation members 448B and 448D.

As shown in FIG. 4 or 5, a cooling fluid outflow portion 4404B to allow inside cooling fluid to flow to the exterior is formed in a side surface of the second relay section 4404 corresponding to the luminous flux emergent side end face of the cross dichroic prism 444. The cooling fluid outflow portion 4404B, configured from a substantially tubular member having a smaller tube diameter dimension than the fluid circulation members 448, is disposed so as to protrude inwardly and outwardly of the second relay section 4404. One end of the fluid circulation member 448 is connected to the outwardly protruding end of the cooling fluid outflow portion 4404B, so that cooling fluid inside the second relay section 4404 flows to the exterior via this fluid circulation member 448.

Exemplary Embodiments Structure of the Radiator

Figure 8A:
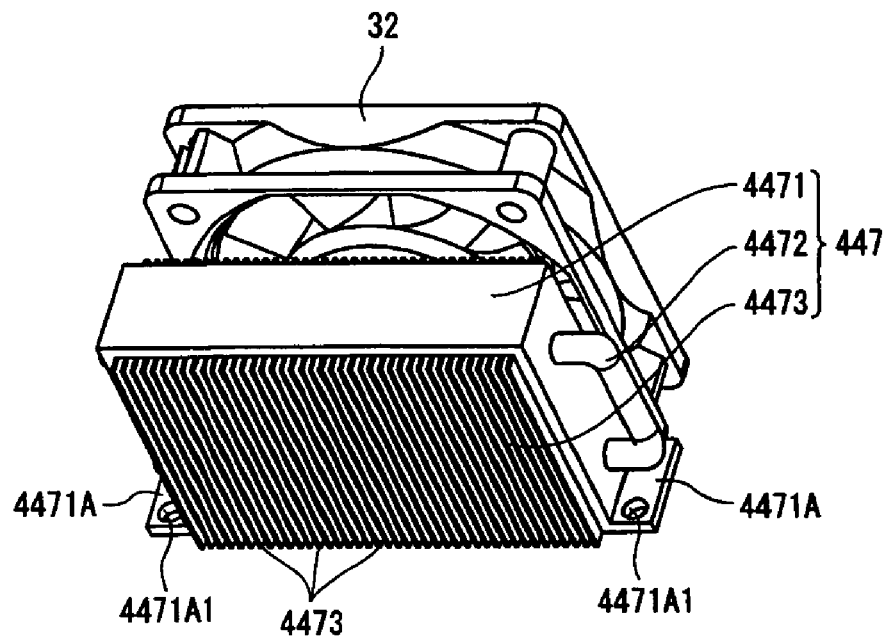
FIGS. 8(A) and 8(B) are schematics showing the structure of a radiator of the first exemplary embodiment and the dispositional relationship between the radiator and an axial fan.
Figure 8B:
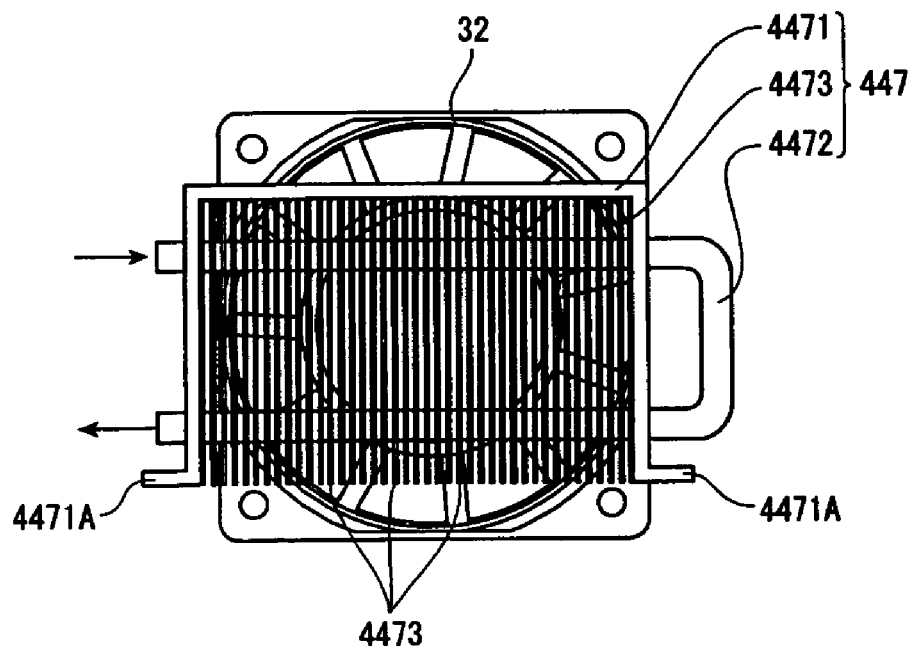

FIGS. 8(A) and 8(B) is a view showing the structure of the radiator 447 and the dispositional relationship between the radiator 447 and the axial fan 32. Specifically, FIG. 8(A) is a perspective view of the radiator 447 and the axial fan 32 as seen from above. FIG. 8(B) is a plan view of the radiator 447 and the axial fan 32 as seen from the radiator 447 side.

As shown in FIG. 1, the radiator 447, disposed within the sidewall 21 formed on the exterior casing 2, radiates the heat of cooling fluid warmed by the liquid crystal panels 441, incident side polarization plates 442, and emergent side polarization plates 443 in the optical device main body 440. As shown in FIG. 8, the radiator 447 includes a fixing portion 4471, a tubular member 4472, and a plurality of fins 4473.

The fixing portion 4471 is configured from a heat conductive member such as, for example, as a metal. As shown in FIG. 8(B), the fixing portion 4471, having a substantially horseshoe shape in plan view, is configured such that the tubular member 4472 can be inserted through the opposed edges of the horseshoe shape. The fixing portion 4471 supports the plurality of heat radiating fins 4473 on the horseshoe-shaped inner side surface thereof. Outwardly extending extensions 4471A are formed at the leading end portions of the horseshoe shape of this fixing portion 4471. Screws (not shown) are screwed into the exterior casing 2 via holes 4471A1 of the extensions 4471A, thereby fixing the radiator 447 to the exterior casing 2.

The tubular member 4472 is configured from aluminum. As shown in FIG. 8(B), the tubular member 4472 has a substantially horseshoe shape such that it extends from one horseshoe-shaped leading end edge to the other horseshoe-shaped leading end edge of the fixing portion 4471, that the extending leading end portion bends at substantially 90° and extends downward, and further that the extending leading end portion bends at substantially 90° and extends from the other leading edge to the one leading edge of the horseshoe shape of the fixing portion 4471. The tubular member 4472 is heat-transferably connected to the fixing portion 4471 and the heat radiating fins 4473. The tubular member 4472 has a smaller tube diameter dimension than the fluid circulation members 448. One upper end of the tubular member 4472 shown in FIG. 8(B) is connected to another end of the fluid circulation member 448 connected to the cooling fluid outflow portion 4404B of the second relay section 4404 of the optical device main body 440. The other upper end of the tubular member 4472 shown in FIG. 8 is connected to the another end of the fluid circulation member 448 connected to the cooling fluid inflow portion 445A of the main tank 445. Accordingly, cooling fluid flowing out from the second relay section 4404 passes through the tubular member 4472 via the fluid circulation member 448, and the cooling fluid passed through the tubular member 4472 flows into the main tank 445 via the fluid circulation member 448.

The heat radiating fins 4473, configured of a plate made of a heat conductive member such as, for example, a metal, are configured such that they are capable of being inserted passed the tubular member 4472. The plurality of heat radiating fins 4473, formed to extend in a direction perpendicular to the insertion direction of the tubular member 4472, are disposed in parallel along the insertion direction of the tubular member 4472. By such disposition of the plurality of heat radiating fins 4473, as shown in FIG. 10, cooling air ejected from the axial fan 32 passes between the plurality of heat radiating fins 4473.

As described above, cooling fluid circulates via the plurality of fluid circulation members 448, 448A, 448B, 448C, and 448D through the flow path: from the main tank 445, through the fluid pumping section 446, the first relay section 4403, the optical modulation element holders 4402, the second relay section 4404, and the radiator 447, to the main tank 445.

Exemplary Embodiments of the Cooling Structure

The fluid pumping section 446 is driven, whereby cooling fluid within the main tank 445 is fed into the fluid pumping section 446 and fed out from the fluid pumping section 446 to the first relay section 4403, via the fluid circulation members 448.

The cooling fluid fed into the first relay section 4403 flows via the fluid circulation members 448A and 448C into the cooling chambers within the three optical modulation element holders 4402 from the insertion holes 4403C of the first relay section 4403.

Heat generated in the liquid crystal panels 441, incident side polarization plates 442, and emergent side polarization plates 443 by the luminous flux emitted from the light source device 411 is transferred to the cooling fluid within the cooling chambers of the frame-like members 4405 and 4406.

The heat transferred to the cooling fluid within the cooling chambers transfers from below to above in accordance with the flow of cooling fluid and is then led to the sides of the outflow ports 4405E by the upper sidewalls of the recesses 4405C and 4406C of the frame-like members 4405 and 4406. The heat moves to the second relay section 4404 via the fluid circulation members 448B and 448D connected to the outflow ports 4405E and further moves to the radiator 447. When warmed cooling fluid passes through the tubular member 4472 of the radiator 447, the heat of the cooling fluid is transferred from the tubular member 4472 to the plurality of heat radiating fins 4473. The heat transferred to the plurality of heat radiating fins 4473 is cooled by cooling air ejected from the axial fan 32.

The cooling fluid cooled by the radiator 447 moves from the radiator 447 through the main tank 445 and the fluid pumping section 446 to the first relay section 4403, and moves again to the interior of the optical modulation element holders 4402.

Cooling air introduced from the exterior into the interior of the projector 1 by the sirocco fan 31 of the cooling unit 3 is introduced into the optical component housing 45 via a hole (not shown) formed in the bottom surface of the optical component housing 45. The cooling air introduced into the optical component housing 45 circulates from below to above. The cooling air circulates while cooling the luminous flux incident side end faces of the incident side polarization plates 442 and the luminous flux emergent side end faces of the emergent side polarization plates 443.

Exemplary Embodiments of an Optical Device Main Body Manufacturing Method

Figure 9:
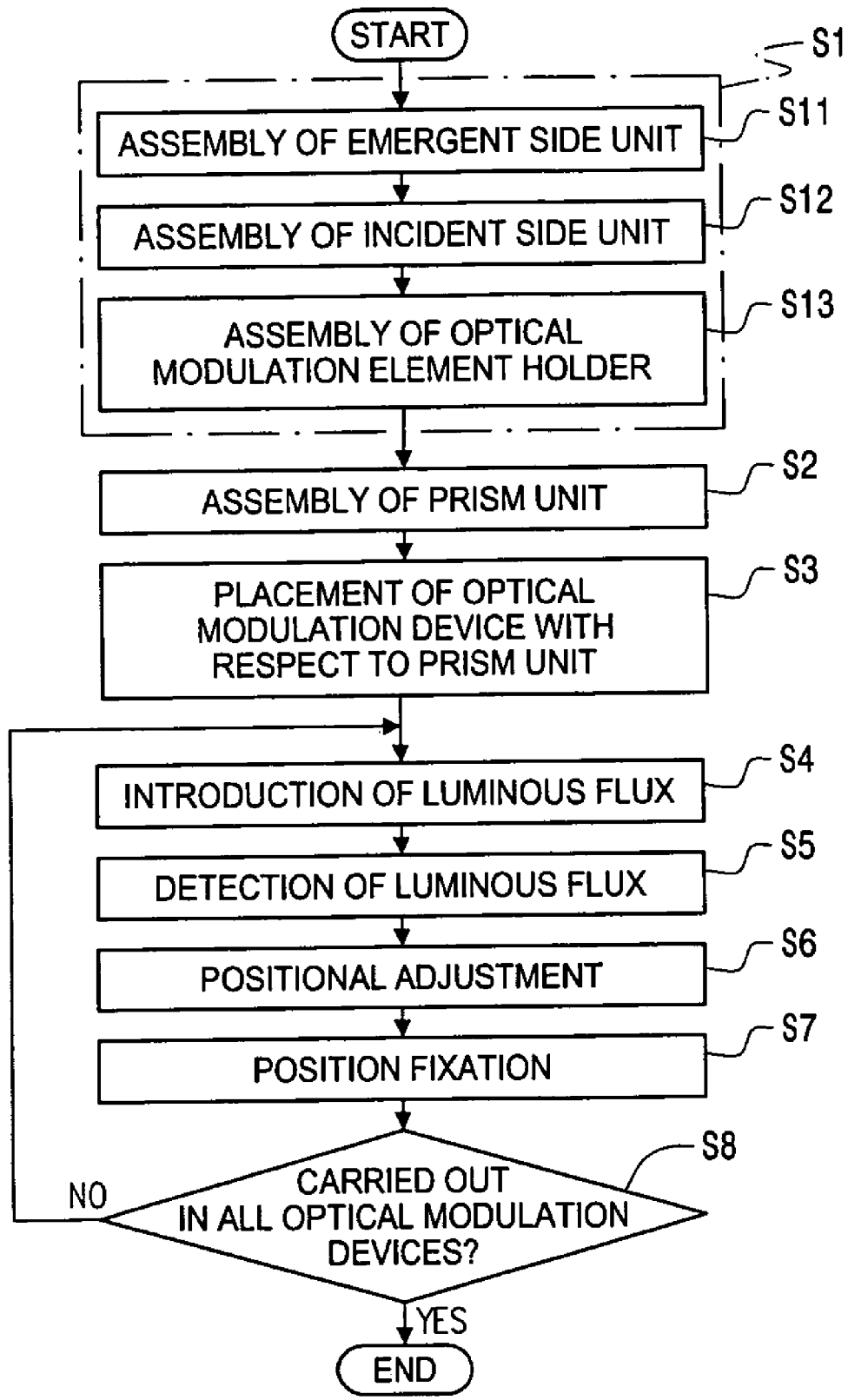
FIG. 9 is a flowchart illustrating a method of manufacturing the optical device main body of the first exemplary embodiment.

FIG. 9 is a flowchart illustrating an exemplary embodiment of a method of manufacturing the optical device main body 440.

The optical device main body 440 manufacturing method is carried out in the state where the interior of the cooling fluid relay section 4401 and optical modulation element holders 4402 are not filled with cooling fluid.

First, in step S1: Optical Modulation Device Assembly Step, the liquid crystal panels 441, incident side polarization plates 442, and emergent side polarization plates 443 are assembled in the optical modulation element holders 4402. A device including the liquid crystal panels 441, incident side polarization plates 442, and emergent side polarization plates 443 in the optical modulation element holders 4402 will hereinafter be referred to as an "optical modulation device" for sake of convenience and clarity.

To assemble the optical modulation device, in step S1, first, the fourth elastic member 4407D, incident side polarization plate 443, and polarization plate fixing member 4408B are attached to the frame-like member 4406 to assemble an emergent side unit.

Specifically, the fourth elastic member 4407D is attached to the recess 4406B formed in the luminous flux emergent side end face of the frame-like member 4406. The light-transmissive member 443A configuring the emergent side polarization plate 443 is disposed on the fourth elastic member 4407D. Thus, the light-transmissive member 443A is pressed and fixed with respect to the frame-like member 4406 by the polarization plate fixing member 4408B.

The viewing angle correction film (not shown) is adhered onto the luminous flux emergent side end face of the light-transmissive member 443A while being positionally adjusted. The polarization film 443B is adhered onto the viewing angle correction film while being positionally adjusted.

To adjust the position of the viewing angle correction film and polarization film 443B, the frame-like member 4406 attached with the fourth elastic member 4407D, light-transmissive member 443A, and polarization plate fixing member 4408B is disposed on a angle adjustment device (not shown) for example. An angle adjustment jig configuring the angle adjustment device is caused to hold the polarization film 443B, and a luminous flux is introduced into the polarization film 443B. Detected thereafter is a luminous flux that, transferred via a reference polarization plate (not shown), has substantially the same polarization axis as the polarization film 443B, viewing angle correction film, light-transmissive member 443A, and incident side polarization plate 442. The angle adjustment jig is operated to adjust the polarization film 443B into such a position that the illuminance of the detected luminous flux is minimized. Thus, the polarization film 443B is adhered onto the viewing angle correction film adhered to the light-transmissive member 443A. The positional adjustment of the viewing angle correction film can be carried out in substantially the same manner.

After step S11, in step S12, the first elastic member 4407D, incident side polarization plate 442, and polarization plate fixing member 4408A are attached to the frame-like member 4405 to assemble an incident side unit. The specific method of assembling the incident side unit can be carried out in substantially the same manner as step S11.

After step S12, in step S13, the liquid crystal panel 441, second elastic member 4407B, support frame 4409, and third elastic member 4407C are assembled in the emergent side unit and incident side unit to provide the optical modulation device.

Specifically, first, the liquid crystal panel 441 is positionally fixed with respect to the support frame 4409.

The second elastic member 4407B is placed in the recess 4405B formed in the luminous flux emergent side end face of the frame-like member 4405 configuring the incident side unit. The support frame 4409 having the liquid crystal panel 441 positionally fixed with respect thereto is placed on the second elastic member 4407B so as to be aligned with the sidewall of the recess 4405B. The third elastic member 4407C is placed on the luminous flux emergent side end face of the liquid crystal panel 441.

The emergent side unit is placed with respect to the incident side unit so that the third elastic member 4407C is positioned in the recess 4406B formed in the luminous flux incident side end face of the frame-like member 4406 configuring the emergent side unit. The connections 4405F and 4406F of the frame-like members 4405 and 4406 are screwed together by the screws 4406H.

After the optical modulation device is assembled at step S1, in step S2, as described below, the cross dichroic prism 444 and cooling fluid relay section 4401 are integrated to form a prism unit.

Specifically, first, the first relay section 4403 is placed in a positioning device (not shown). A TV cure adhesive is applied to the bulge (not shown) of the first relay section 4403, and the lower surface of the cross dichroic prism 444 is abutted against the bulge of the first relay section 4403. The positional adjustment of the cross dichroic prism 444 with respect to the first relay section 4403 is carried out in an uncured state of the UV cure adhesive.

The following configurations may be adopted as the positional adjustment of the cross dichroic prism 444 with respect to the first relay section 4403. That is, for example, the upper surface of the cross dichroic prism 444 is detected for an optical image by an optical image detection device such as a CCD. The cross dichroic prism 444 is positionally adjusted such that a crisscross position of the cross dichroic prism 444 formed by the two dielectric multilayer films thereof falls into a predetermined position based on the detected image. For example, a luminous flux is introduced from the luminous flux incident side end face of the cross dichroic prism 444. The cross dichroic prism 444 is positionally adjusted based on a luminous flux emergent from the luminous flux emergent side end face thereof.

Next, an anaerobic adhesive is applied to the upper surface of the cross dichroic prism 444, and the second relay section 4404 is placed, as being positioned in position, on the upper surface of the cross dichroic prism 444 using the positioning jig (not shown). Thereafter, together with the positioning jig, the first relay section 4403, cross dichroic prism 444, and second relay section 4404 are left in a drying machine (e.g., at 65° for 15 minutes), thus curing the anaerobic adhesive.

After steps S1 and S2, in step S3: Optical Modulation Device Step, as shown below, three optical modulation devices are placed with respect to the prism unit.

Specifically, first, the prism unit is placed on a position adjustment device (not shown) at a predetermined position.

The sealing rings 4403D and 4404C are placed on the another end sides of the fluid circulation members 448A, 448B, 448D, and 448D connected to the frame-like members 4405 and 4406 configuring the optical modulation devices. In this state, the position adjustment jig configuring the position adjustment device is caused to hold the optical modulation devices.

The position adjustment jig is operated to move the optical modulation devices. The another end sides of the fluid circulation members 448A, 448B, 448C, and 448D are inserted through the insertion holes 4403C of the first relay section 4403 and the insertion holes 4404A of the second relay section 4404 which relay sections configure the prism unit.

After the optical modulation devices are placed with respect to the prism unit at Step S3, in step S4: Luminous Flux Introduction Step, the light source device configuring the aforesaid position adjustment device is driven to first introduce a luminous flux into the incident side polarization plate 442, liquid crystal panel 441, and emergent side polarization plate 443 that configure the optical modulation device on the G color side.

After step S4, in step S5: Optical Image Detection Step), the optical image detection device such as, for example, a CCD configuring the position adjustment device, is caused to detect a luminous flux transferred via the incident side polarization plate 442, liquid crystal panel 4410, emergent side polarization plate 443, and cross dichroic prism 444.

After step S5, in step S6: Positional Adjustment Step, the positional adjustment of the liquid crystal panels 441 with respect to the cross dichroic prism 444 is carried out.

In this step, the optical path of a luminous flux passing through the cooling chambers of the optical modulation element holder 4402 with the cooling chambers filled with cooling fluid becomes smaller in length than the optical path of a luminous flux passing through the cooling chambers of the optical modulation element holder 4402 with the cooling chambers filled with no cooling fluid. Consequently, first, the optical image detection device is approximated to the cross dichroic prism 444 in an optical axis direction by an amount equivalent to the deviation in optical path length.

The position adjustment jig holding the optical modulation device on the G color side is operated to alter the insertion condition for the fluid circulation members 448A, 448B, 448C, and 448D with respect to the insertion holes 4403C and 4404A of the first relay section 4403 and second relay section 4404. Thus, alignment adjustment (adjustment in an X axis and Y axis direction perpendicular to the optical axis direction, rotational adjustment within an XY plane) and focus adjustment (adjustment in the optical axis direction, rotational adjustment around the X axis, and rotational adjustment around the Y axis) are carried out.

After the positional adjustment of the liquid crystal panel 441G is carried out in step S6, in step S7: Position Fixation Step, the insertion holes 4403C and 4404A of the first relay section 4403 and second relay section 4404 are fixed to the fluid circulation members 448A, 448B, 448C, and 448D connected to the frame-like members 4405 and 4406 of the optical modulation device on the G color side, by an adhesive, soldering, or the like, using the sealing rings 4403D and 4404C. The sealing seals the clearances between the insertion holes 4403C and 4404A and the fluid circulation members 448A, 448B, 448C, and 448D.

With reference to the liquid crystal panel 441G having completed the positional adjustment and fixation, steps S4 to S7 are carried out with respect to the liquid crystal panels 441R and 441B (step S8).

Steps S4 to S8 are carried out with respect to the optical modulation device on the G color side first, and thereafter are sequentially carried out with respect to the other optical modulation devices. However, the configuration is not limited thereto, but steps S4 to S7 may be carried out, substantially simultaneously, with respect to the three optical modulation devices.

According to the first exemplary embodiment, to assemble the optical device main body 440, the another ends of the fluid circulation members 448A to 448D, connected in communication to the cooling chambers of the optical modulation element holder 4402, are inserted through the insertion holes 4403C and 4404A of the first relay section 4403 and second relay section 4404. In this state, the insertion condition for the fluid circulation members 448A to 448D through these insertion holes 4403C and 4404A is altered, thereby making it possible to carry out the positional adjustment of the liquid crystal panel 441 held by the optical modulation element holder 4402. Accordingly, there is no need to bend the fluid circulation members 448A to 448D connected to the optical modulation element holder 4402. Thus, the liquid crystal panel 441 can be easily positioned in a predetermined position on the optical axis of the luminous flux emitted from the light source device 411.

The first relay section 4403, second relay section 4404, and optical modulation element holder 4402 are connected together by the four fluid circulation members 448A to 448D. Therefore, it is possible to reinforce the support condition for the optical modulation element holder 4402 with respect to the first relay section 4403 and second relay section 4404. To assemble the optical device main body 440, it is possible to easily carry out the alteration of the insertion condition for the four fluid circulation members 448A to 448D through the insertion holes 4403C and 4404A. This makes it possible to further easily carry out the positioning of the liquid crystal panels 441 while stably supporting the optical modulation element holder 4402 with respect to the first relay section 4403 and second relay section 4404.

The cooling chambers are formed within both the pair of frame-like members 4405 and 4406, so that both the luminous flux incident and emergent sides of each of the liquid crystal panel 441 can be cooled by cooling fluid, which can efficiently cool the liquid crystal panel 441.

The cooling fluid relay section 4401 has a two-body configuration made up of the first relay section 4403 and second relay section 4404. Therefore, in the cooling chambers of the optical modulation element holder 4402, it is possible to smoothly carry out the circulation of cooling fluid moving from upstream to downstream. This can accelerate the convective velocity of cooling fluid and thus can further efficiently cool the liquid crystal panel 441.

The pair of frame-like members 4405 and 4406 have a rectangular shape in plan view, and the inflow ports 4405D and 4406D and outflow ports 4405E are disposed near the four corner positions of the rectangular shape in a top plan view. Therefore, the support condition for the optical modulation element holder 4402 with respect to the first relay section 4403 and second relay section 4404 can be further stably supported by the four fluid circulation members 448A to 448D. At the same time, the positioning of the liquid crystal panels 441 can be still further easily carried out.

The inflow ports 4405D and 4406D and outflow ports 4405E are formed near the four corner positions of the rectangular shape in top plan view. Therefore, cooling fluid can convectively circulate all over the cooling chambers, which can efficiently cool the liquid crystal panel 441 without accumulating warmed cooling fluid within the cooling chambers.

The optical modulation element holder 4402 supports not only the liquid crystal panel 441 but also the incident side polarization plate 442 and emergent side polarization plate 443. Therefore, it is possible to easily carry out the positioning of not only the liquid crystal panel 441 but also the incident side polarization plate 442 and emergent side polarization plate 443. Heat generated in the incident side polarization plate 442 and emergent side polarization plate 443 by the luminous flux emitted from the light source device 411 can be radiated to cooling fluid circulating by convection in the cooling chambers of the optical modulation element holder 4402.

The first relay section 4403 and second relay section 4404 configuring the cooling fluid relay section 4401, attached to the upper and lower surfaces of the cross dichroic prism 444, have a total of six insertion holes 4403C and 4404A in response to the four fluid circulation members 448A to 448D connected to the three optical modulation element holders 4402. Therefore, there is no need to provide three cooling fluid relay sections 4401 in response to the three optical modulation element holders 4402. Thus, the members for supporting the three optical modulation element holders 4402 are made into a common one, and the optical device main body 440 is formed into a compact configuration, which enables a reduction in size of the optical device main body 440.

The cooling fluid relay section 4401 is made common to the three optical modulation element holders 4402. Thereby, even when the three optical modulation element holders 4402 are connected to the other members such as the main tank 445, fluid pumping section 446, and radiator 447, the cooling fluid relay section 4401 need only be connected to the aforesaid other members. Thus, there is no need for the fluid circulation members 448 to provide direct connections between the three optical modulation element holders 4402 and the aforesaid other members. Consequently, the operation of tubing the fluid circulation members 448 can be easily carried out, thus making it possible to easily carry out the operation of assembling the optical device 44.

The optical device main body 440 can be reduced in size, thereby making it possible to reduce the impact of external force, so that the mutual positions of the three liquid crystal panels 441R, 441G, and 441B are maintained in good condition, which can form a favorable optical image having no pixel deviation.

The method of manufacturing the optical device main body 440 includes the optical modulation device assembly step S1, optical modulation device placement step S3, luminous flux introduction step S4, positional adjustment step S6, and position fixation step S7. Thereby, at the positional adjustment step S6, the liquid crystal panel 441 can be easily positioned in a predetermined position on the optical axis of the luminous flux emitted from the light source device 411, without bending the fluid circulation members 448A to 448D connected to the optical modulation element holder 4402. At the position fixation step S7, the optical modulation element holder 4402 thus positioned in position is positionally fixed with respect to the cooling fluid relay section 4401. At the same time, the clearances between the insertion holes 4403C and 4404A and the fluid circulation members 448A to 448D are sealed with the sealing rings 4403D and 4404C. Therefore, the liquid crystal panel 441 can be positionally fixed at a predetermined position, and it is possible to manufacture the favorable optical device main body 440 having no, or minimal, leakage of cooling fluid from the connections between the insertion holes 4403C and 4404A and the fluid circulation members 448A to 448D.

The method of manufacturing the optical device main body 440 is carried out without being filled with cooling fluid. The method of manufacturing the optical device main body 440 includes the optical image detection step S5. At the positional adjustment step S6, the positional adjustment of the liquid crystal panel 441 is carried out based on an optical image detected in the following manner. That is, the image is detected by the optical image detection device with the optical image detection device deviated in a direction along the optical axis so that the optical image detection device is approximated to the cross dichroic prism 444 by an amount equivalent to the deviation in length between the optical path passing through cooling fluid within the cooling chambers of the optical modulation element holder 4402 filled with cooling fluid and the optical path passing through air within the cooling chambers of the optical modulation element holder 4402 filled with no cooling fluid. Thereby, even when the optical device main body 440 is manufactured without being filled with cooling fluid, the optical device main body 440 can be positioned in an optimum position of the liquid crystal panel 441 filled with cooling fluid. Accordingly, there is no need to adjust the position of the optical modulation element holder 4402 again after the optical device main body 440 is manufactured, the optical device 44 is assembled, and the inside of this optical device 44 is filled with cooling fluid.

The projector 1 includes the optical device main body 440 capable of favorably positioning the liquid crystal panel 441 in a predetermined position. Therefore, the liquid crystal panel 441 is virtually never deviated in position with respect to the optical axis of the luminous flux emitted from the light source device 411, so that undesired light is virtually never projected onto the screen.

A Second Exemplary Embodiment

A second exemplary embodiment of the invention will now be described with reference to the drawings.

In the following description, like numerals refer to the same structures and members as in the first embodiment.

The second exemplary embodiment is different from the first embodiment in that support portions 5408B3 for supporting the fluid circulation members 448A, 448B, 448C, and 448D are added to a polarization plate fixing member 5408B for pressing and fixing the emergent side polarization plate 443 with respect to the frame-like member 4406 configuring an optical device main body 540. The other structures are the same as those of the first exemplary embodiment.

Specifically, FIG. 10 is a perspective view of an exemplary embodiment showing the structure of the polarization plate fixing member 5408B.

The polarization plate fixing member 5408B, serving as the light-transmissive substrate pressing member, presses and fixes the emergent side polarization plate 443 via the fourth elastic member 4407D, with respect to the recess 4406B formed in the luminous flux emergent side end face of the frame-like member 4406, and supports the fluid circulation members 448A, 448B, 448C, and 448D. The specific shape of the polarization plate fixing member 5408B is substantially the same as that of the polarization plate fixing member 4408B described in the first exemplary embodiment. As shown in FIG. 10, the polarization plate fixing member 5408B has an opening 5408B1 and a hook engagement portion 5408B2 corresponding to the opening 4408B1 and hook engagement portion 4408B2 of the polarization plate fixing member 4408B.

The support portions 5408B3 extending in an up and down direction are formed on the upper end corner portions and lower end corner portions of the polarization plate fixing member 5408B.

The support portions 5408B3 are portions for supporting the another end sides of the fluid circulation members 448A, 448B, 448C, and 448D that are connected to the frame-like members 4405 and 4406 and extend to the luminous flux emergent side. The support portions 5408B3 define holes 5408B4 capable of receiving therethrough the fluid circulation members 448A, 448B, 448C, and 448D.

Figure 11:
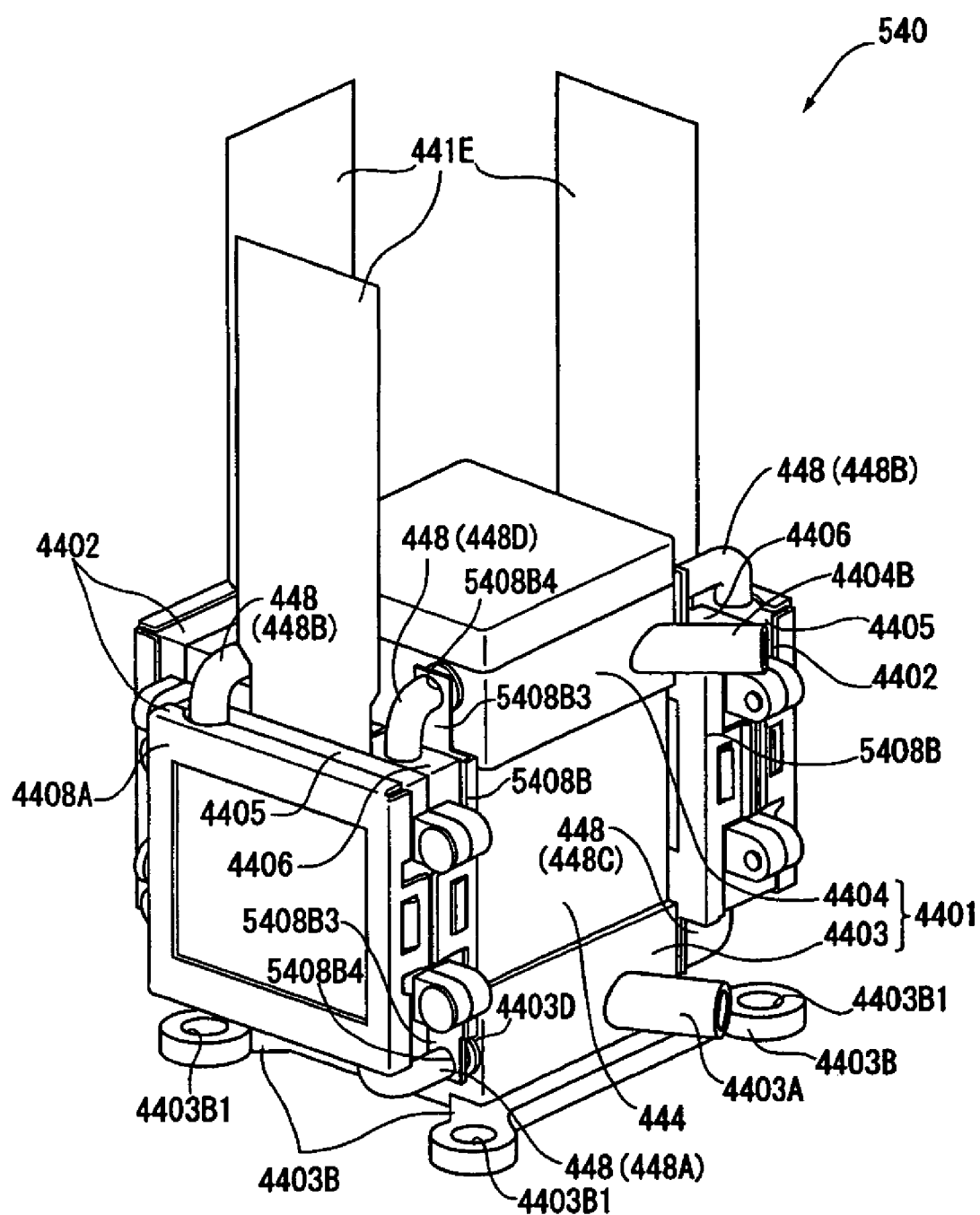
FIG. 11 is a perspective view showing the state in which an optical device main body has the polarization plate fixing member of the second exemplary embodiment.

FIG. 11 is a perspective view of an exemplary embodiment showing the state in which the optical device main body 540 having the polarization plate fixing member 5408B is assembled.

With the optical device main body 540 assembled, as shown in FIG. 11, the fluid circulation members 448A, 448B, 448C, and 448D are inserted through the holes 5408B4 of the support portions 5408B3 of the polarization plate fixing member 5408B. Thus, the state is established in which the fluid circulation members 448A, 448B, 448C, and 448D are supported on the support portions 5408B3 of the polarization plate fixing member 5408B.

The structures of cooling the liquid crystal panel 441, incident side polarization plate 442, and emergent side polarization plate 443 and the method of manufacturing the optical device main body 540 are substantially the same as the cooling structure and manufacturing method described in the first exemplary embodiment.

In the second exemplary embodiment described above, as compared with the first exemplary embodiment, when the optical device main body 540 is assembled, the another end sides of the fluid circulation members 448A to 448D providing a connection between the optical modulation element holder 4402 and the cooling fluid relay section 4401 are inserted through the holes 5408B4 of the support portions 5408B3 of the polarization plate fixing member 5408B. Therefore, this reinforces the support condition for the optical modulation element holder 4402 with respect to the cooling fluid relay section 4401. Thus, the impact of external force is reduced, which makes it possible to avoid the displacement of the optical modulation element holder 4402, e.g., the displacement of the liquid crystal panel 441 with respect to the cooling fluid relay section 4401.

The polarization plate fixing member 5408B makes it possible to reduce the impact of external force on the fluid circulation members 448A to 448D providing a connection between the optical modulation element holder 4402 and the cooling fluid relay section 4401. Therefore, the connection condition between the insertion holes 4403C and 4404A of the cooling fluid relay section 4401 and the fluid circulation members 448A to 448D can be improved, thus making it possible to favorably reduce the leakage of cooling fluid from these connections.

Furthermore, the support portions 5408B3 for supporting the fluid circulation members 448A to 448D thereon are formed on the polarization plate fixing member 5408B. Thereby, as compared with the structure in which the members other than the optical modulation element holder 4402 support the fluid circulation members 448A to 448D, the other members can be omitted, thus enabling a reduction in size and cost of the optical device main body 440.

A Third Exemplary Embodiment

A third exemplary embodiment of the invention will now be described with reference to the drawings.

In the following description, like numerals refer to the same structures and members as in the first exemplary embodiment.

The third exemplary embodiment is different from the first embodiment only in that a support member 6410 for supporting the fluid circulation members 448A, 448B, 448C, and 448D is added to an optical device main body 640.

Figure 12:
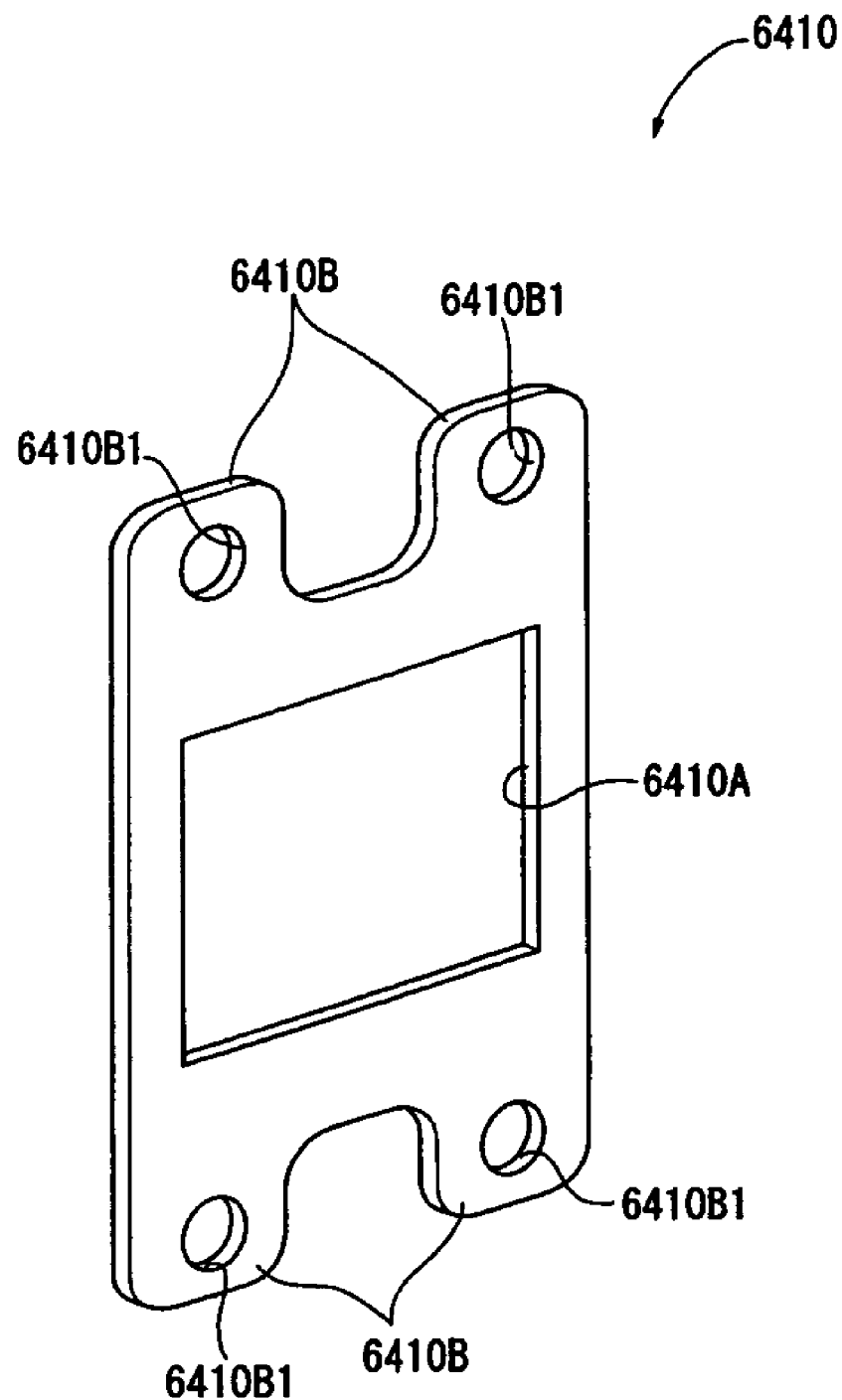
FIG. 12 is a perspective view showing the structure of a support member of a third exemplary embodiment.

Specifically, FIG. 12 is a perspective view of an exemplary embodiment showing the structure of the support member 6410.

Figure 13:
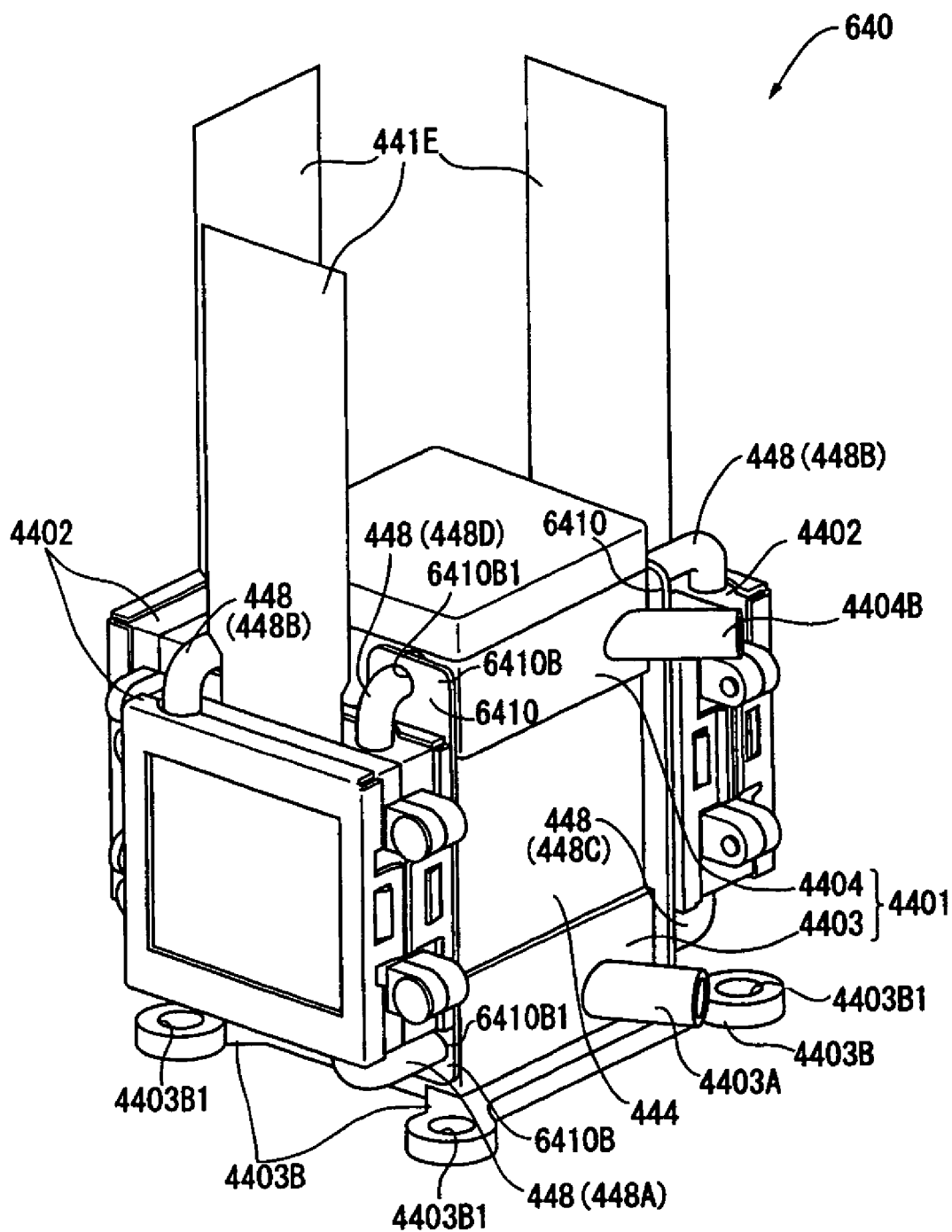
FIG. 13 is a perspective view showing the state in which an optical device main body has the support member of the third exemplary embodiment.

FIG. 13 is a perspective view of an exemplary embodiment showing the state in which the optical device main body 640 having the support member 6410 is assembled.

The support member 6410, configured from a substantially rectangular plate, is adhered to each of the luminous flux emergent sides of the three optical modulation element holders 4402.

As shown in FIG. 12, an opening 6410A for transmitting therethrough a luminous flux transferred via the incident side polarization plate 422, liquid crystal panel 441, and emergent side polarization plate 443 is formed in a substantially central portion of the support member 6410.

Support portions 6410B extending in an up and down direction are formed on the upper end corner portions and lower end corner portions of this support member 6410.

Support portions 5408B3 are portions for supporting the another end sides of the fluid circulation members 448A, 448B, 448C, and 448D that are connected to the frame-like members 4405 and 4406 and extend to the luminous flux emergent side. The support portions 6410B have holes 6410B1 capable of receiving therethrough the fluid circulation members 448A, 448B, 448C, and 448D.

In the assembled optical device main body 640, as shown in FIG. 13, the fluid circulation members 448A, 448B, 448C, 448D have been inserted through the holes 6410B1 of the support portions 6410B of the support member 6410. Thus, the state is established in which the fluid circulation members 448A, 448B, 448C, 448D are supported on the support portions 6410B of the support member 6410.

The structure of cooling the liquid crystal panel 441, incident side polarization plate 442, and emergent side polarization plate 443 and the method of manufacturing the optical device main body 640 are substantially the same as the cooling structure and manufacturing method described in the first exemplary embodiment.

In the third exemplary embodiment described above, as compared with the first exemplary embodiment, the optical device main body 640 includes the support member 6410 defining the four holes 6410B1. Therefore, when the optical device main body 640 is assembled, the four fluid circulation members 448A to 448D providing a connection between the optical modulation element holder 4402 and the cooling fluid relay section 4401 are inserted through the four holes 6410B1 of the support portion 6410. Accordingly, this reinforces the support condition for the optical modulation element holder 4402 with respect to the cooling fluid relay section 4401. Thus, the impact of external force is reduced, which makes it possible to avoid the displacement of the optical modulation element holder 4402, e.g., the displacement of the liquid crystal panel 441 with respect to the cooling fluid relay section 4401.

The support member 6410 makes it possible to reduce the impact of external force on the four fluid circulation members 448A to 448D providing a connection between the optical modulation element holder 4402 and the cooling fluid relay section 4401. Therefore, the connection condition between the insertion holes 4403C and 4404A of the cooling fluid relay section 4401 and the fluid circulation members 448A to 448D, as well as each of the inflow ports 4405D, 4496D and outflow ports 4405E and the fluid circulation members 448A to 448D can be improved, thus making it possible to favorably reduce the leakage of cooling fluid from these connections.

Furthermore, the support member 6410 can be formed in a simple structure, and thereby not increase the manufacturing cost of the optical device main body 440.

Still furthermore, according to the second and third exemplary embodiments described above, the fluid circulation members 448A, 448B, 448C, 448D can be fixed at right angles to the panel surface of the liquid crystal panel 441 by the polarization plate fixing member 5408B or support member 6410 restricting the attachment angle of the fluid circulation members 448A to 448D.

The exemplary embodiments have so far been described by reference to the preferred embodiments; however, the features of the exemplary embodiments may be obtained through various modifications and design variations without departing from the spirit and scope of the exemplary embodiments.

For example, aforesaid exemplary embodiments describe a configuration such that the cooling chambers are formed inside both the pair of frame-like members 4405 and 4406; however, other exemplary embodiments include configurations such that the cooling chamber is formed inside either of the frame-like members 4405 and 4406. The configuration may be such, for example, that communication ports are formed in the pair of frame-like members 4405 and 4406 and that these communication ports provide a communication connection between the cooling chambers formed inside both of the pair of frame-like members 4405 and 4406.

In exemplary embodiments with configurations such as described above, the optical modulation element holder need only be formed with at least one set of the inflow and outflow ports. Thus, at least one insertion hole need only be formed in each of the side surfaces of the first relay section 4403 and second relay section 4404 so as to be capable of receiving therethrough at least two fluid circulation members providing a communication connection between the inflow and outflow ports.

The optical modulation element holder 4402 may have any configuration such that it holds the liquid crystal panel 441 so as to be able to transfer heat to interior cooling fluid. For example, the cooling chambers inside the optical modulation element holder 4402 are formed at the positions corresponding to the image formation regions of the liquid crystal panel 441, but maybe formed at positions exclusive of the image formation regions of the liquid crystal panel 441.

The exemplary embodiments are not limited to the formation position and number of the inflow ports 4405D and 4406D and outflow ports 4405E described in the aforesaid exemplary embodiments, but may adopt any other formation position and number. For example, exemplary embodiments may adopt a configuration such that the flow direction of cooling fluid is reversed to allow the inflow ports 4405D and 4406D and outflow ports 4405E to function as the outflow ports and inflow ports, respectively.

The aforesaid exemplary embodiments describe a configuration such that the optical device 44 includes the main tank 445, fluid pumping section 446, and radiator 447.

However, the main tank 445, fluid pumping section 446, and radiator 447 can be omitted from exemplary embodiments.

In the aforesaid exemplary embodiments, the incident side polarization plate 442 and emergent side polarization plate 443 are disposed on the outer surfaces of the pair of frame-like members 4405 and 4406, and the light-transmissive substrates 442A and 443A of the incident side polarization plate 442 and emergent side polarization plate 443 close the cooling chambers. However, exemplary embodiments may include light-transmissive substrates, such as glass, having no polarization films adhered thereon to close the cooling chambers. On this occasion, the incident side and emergent side polarization plates do not provide the absorptive polarization plate, described in the aforesaid embodiments but a reflective polarization plate, that transmits a luminous flux having a predetermined polarization axis and reflects luminous fluxes having the other polarization axes. Then, a rise in temperature due to the luminous flux emitted from the light source can be suppressed without cooling the incident side and emergent side polarization plates with cooling fluid.

Exemplary embodiments describe the optical conversion film adopting both the polarization film and the viewing angle correction film. However, exemplary embodiments of the invention are not limited thereto, but may be configured to include other optical conversion films. Exemplary embodiments of the invention may also be configured to adopt only any of these other optical conversion films.

In the aforesaid exemplary embodiments, the fluid circulation members 448, 448A to 448D, main tank 445, fluid pumping section 446, tubular member 4472 of the radiator 447, frame-like members 4405 and 4406, first relay section 4403, and second relay section 4404, which are the members making contact with cooling fluid, are configured from an aluminum member. However, these members may be configured from not only aluminum but also any other material having corrosion resistivity, and may be configured from oxygen-free copper or duralumin. The fluid circulation members 448, 448A to 448D may use butyl rubber, fluorocarbon rubber, or the like of low hardness that has a small deformation reaction force to the optical modulation element holder 4402 and suppresses pixel deviation.

In the exemplary embodiments, the flow rates of cooling fluid flowing into the optical modulation element holders 4402 are set to substantially the same value. However, exemplary embodiments may adopt a configuration such that the flow rates of cooling fluid flowing into the optical modulation element holders 4402 are set to different values.

For example, exemplary embodiments may adopt a configuration such that valves are disposed in the flow paths from the first relay section 4403 to the optical modulation element holders 4402 and that the flow paths are narrowed and widened by altering the positions of the valves.

For example, exemplary embodiments may adopt a configuration such that the fluid circulation members 448A and 448C providing a connection between the first relay section 4403 and the optical modulation element holder 4402, have a tube diameter dimension that varies according to the liquid crystal panels 441R, 441G, and 441B.

In the aforesaid exemplary embodiments, the sirocco fan 31 sends air, thereby cooling the outer surface of the optical modulation element holder 4402 and the bottom surface of the optical component housing 45. However, objects of the exemplary embodiments can be sufficiently achieved even with the sirocco fan 31 omitted. Such a configuration can contribute to a reduction in noise.

In the aforesaid exemplary embodiments, the method of manufacturing the optical device main bodies 440, 540, and 640 is not limited to the flow shown in FIG. 9 and may be carried out in a different order. For example, step S11 and step S12 may be carried out in reverse order, and step S1 and step S2 may be carried out in reverse order.

The exemplary embodiments describe a configuration such that the optical unit 4 has a substantially L-shape in plan view. However, the exemplary embodiments may adopt a configuration such, for example, that the optical unit 4 has a substantially U-shape in plan view.

The aforesaid exemplary embodiments cite an example of the projector 1 using the three liquid crystal panels 441. However, exemplary embodiments include a projector using only one liquid crystal panel, a projector using only two liquid crystal panels, or a projector using four or more liquid crystal panels.

In the aforesaid exemplary embodiments, the light incident surface and light emergent surface use different transmissive liquid crystal panels. However, the light incident surface and light emergent surface may use an identical reflective liquid crystal panel.

The aforesaid exemplary embodiments use the liquid crystal panel as the optical modulation element. However, the exemplary embodiments may use an optical modulation element other than a liquid crystal, such as a device using a micro mirror. In that case, the luminous flux incident side and emergent side polarization plates can be omitted.

The aforesaid exemplary embodiments cite an example of the front type projector that carries out a projection from a direction for observing the screen. However, exemplary embodiments include a rear type projector that carries out a projection from the side opposite the direction for observing the screen.

Although the above description discloses an enhanced or the optimum configuration and the like for carrying out the invention, the invention is not limited thereto. That is, the invention is particularly illustrated and described in terms of mainly the specific embodiments, but those skilled in the art can add various modifications, in shape, material, quantity, and other detailed configurations, to the exemplary embodiments described above without departing from the scope of the technical idea and object of the invention.

Accordingly, the description that limits the aforesaid disclosed shapes, materials, and the like is illustratively made for easy understanding of the invention and does not limit the invention. Therefore, the invention includes the description with the name of any member that comes out of part or all of the limitations on those shapes, materials, and the like.

The optical device of exemplary embodiments can easily position the optical modulation element in a predetermined position and thus is useful as an optical device of a projector utilized for a movie theater at home and for a presentation.

What is claimed is:

1. An optical device, comprising:
   a light source;
   an optical modulation element to modulate a luminous flux emitted from the light source in response to image information to form an optical image;
   an optical modulation element holder that is formed with cooling chambers having cooling fluid sealed in an interior, and that holds the optical modulation element so as to be able to transfer heat to the cooling fluid within the cooling chambers;
   a plurality of fluid circulation members that are connected in communication to the cooling chambers of the optical modulation element holder and that guide the cooling fluid to an exterior of the cooling chambers and lead the cooling fluid again into the interior of the cooling chambers; and a cooling fluid relay section that is disposed at a predetermined position relative to an optical axis of the luminous flux emitted from the light source and that relays, via the plurality of fluid circulation members, at least one of cooling fluid moving from the exterior to the interior of the cooling chambers of the optical modulation element holder, and cooling fluid moving from the interior to the exterior of the cooling chambers of the optical modulation element holder;

the optical modulation element holder defining an inflow port to allow the cooling fluid to flow into the interior of the cooling chambers and an outflow port to allow the cooling fluid inside the cooling chambers to the exterior of the cooling chambers;

the plurality of fluid circulation members including fluid circulation members that each have one-side end connected in communication to the inflow port and outflow port so that another-side end thereof protrudes in the optical axis direction of the luminous flux emitted from the light source; and the cooling fluid relay section defining insertion holes that extend inwardly through the cooling fluid relay section and that are capable of receiving therethrough the another-side end of the fluid circulation members connected in communication to the inflow port and outflow port.

2. The optical device as claimed in claim 1, the cooling fluid relay section including a first relay section to relay the cooling fluid moving from the exterior to the interior of the cooling chambers of the optical modulation element holder and a second relay section to relay the cooling fluid moving from the interior to the exterior of the cooling chambers of the optical modulation element holder;

the optical modulation element holder including a pair of frame-like members that are formed with openings corresponding to image formation regions of the optical modulation element and that clamp the optical modulation element therebetween, and a pair of light-transmissive substrates disposed on surface sides of the pair of frame-like members opposite the opposed surfaces thereof;

the openings of the pair of frame-like members being closed, by the optical modulation element and the pair of light-transmissive substrates, on the sides of the opposed surfaces of the pair of frame-like members and on their face sides opposite the opposed surfaces, thereby forming the cooling chambers inside both the pair of frame-like members;

the inflow port, with the optical device assembled, being formed at a side end of each of the pair of frame-like members on the first relay section side;

the outflow port, with the optical device assembled, being formed at a side end of each of the pair of frame-like members on the second relay section side; and the first relay section and the second relay section defining the insertion holes, that extend inwardly through the first relay section and second relay section and that are capable of receiving therethrough the another-side end of the fluid circulation members connected in communication to the inflow port.

3. The optical device as claimed in claim 2, the pair of frame-like members having a rectangular shape in plan view; and the inflow port and outflow port formed near diagonal positions of the opposed side ends of the frame-like member, the pair of frame-like members joined such that when the inflow port and outflow port of at least one of the pair of frame-like members are projected on the other frame-like member, the inflow port and the outflow port are disposed at opposed side end positions of the other frame-like member and opposite the inflow port and outflow port of the other frame-like member.

4. The optical device as claimed in claim 2, the optical modulation element holder including a pair of light-transmissive substrate pressing members for pressing and fixing the pair of light-transmissive substrates to the pair of frame-like members, at least one of the pair of light-transmissive substrate processing members having support portions, the support portions defining a plurality of holes for receiving therethrough the another-side end of the fluid circulation members connected in communication to the inflow port and outflow port and which support the fluid circulation members.

5. The optical device as claimed in claim 2, further including at least one optical conversion element to convert the optical characteristic of an incident luminous flux, the optical conversion element including a light-transmissive substrate and an optical conversion film that is formed on the light-transmissive substrate and that converts the optical characteristic of the incident luminous flux, and at least one of the light-transmissive substrates configuring the optical modulation element holder being the light-transmissive substrate configuring the optical conversion element.

6. The optical device as claimed in claim 1, further including support members that support the fluid circulation members that are interposed between the optical modulation element holder and the cooling fluid relay section, the support members defining a plurality of holes for receiving therethrough the another-side end of the fluid circulation members connected in communication to the inflow port and outflow port.

7. The optical device as claimed in claim 1, further including:

a plurality of the optical modulation elements;

a plurality of the optical modulation element holders corresponding to the plurality of the optical modulation elements; and a color combination optical device having a plurality of luminous flux incident side end faces, disposed on the plurality of the optical modulation element holders, the luminous flux incident side end faces combining luminous fluxes modulated by the plurality of the optical modulation elements, the cooling fluid relay section including: a first relay section attached to at least one of the end faces of the color combination optical device intersecting with the plurality of luminous flux incident side end faces, the first relay section having multiple branches to provide the cooling fluid to flow into the interior of the cooling chambers of the plurality of the optical modulation element holders; and a second relay section attached to another end face of the color combination optical device intersecting with the plurality of luminous flux incident side end faces, to collectively feed in the cooling fluid flowing out from the interior of the plurality of the optical modulation element holders, and the first relay section and second relay section defining insertion holes that extend inwardly through the first relay section and the second relay section and being capable of receiving therethrough the another-side end of the fluid circulation members connected in communication to the inflow ports and outflow ports of the plurality of the optical modulation element holders.

8. An optical device manufacturing method for manufacturing an optical device including:
a light source; an optical modulation element to modulate a luminous flux emitted from the light source in response to image information to form an optical image; an optical modulation element holder that is formed with cooling chambers having cooling fluid sealed in an interior and that holds the optical modulation element so as to be able to transfer heat to the cooling fluid within the cooling chambers; a plurality of fluid circulation members that are connected in communication to the cooling chambers of the optical modulation element holder and that guide the cooling fluid to the exterior of the cooling chambers and lead the cooling fluid again into an interior of the cooling chambers, the optical device including a cooling fluid relay section to relay the cooling fluid moving from the exterior to the interior of the cooling chambers of the optical modulation element holder and the cooling fluid moving from the interior to the exterior of the cooling chambers of the optical modulation element holder via the plurality of fluid circulation members, the plurality of fluid circulation members including at least two fluid circulation members that each have one-side end connected in communication to the cooling chambers of the optical modulation element holder and being formed so that another-side end protrudes in the optical axis direction of the luminous flux emitted from the light source, and the cooling fluid relay section defining insertion holes that extend inwardly through the cooling fluid relay section and that are capable of receiving therethrough the another-side end of the at least two fluid circulation members, the method of manufacturing the optical device comprising:
holding the optical modulation device on the optical modulation element holder;
inserting another-side end of the at least two fluid circulation members connected to the optical modulation element through the insertion holes of the cooling fluid relay section;
introducing a luminous flux into the optical modulation element;
modifying the insertion condition for the another-side end of the at least two fluid circulation members through the insertion holes based on the luminous flux, the luminous flux being introduced into the optical modulation element and made emergent from the optical modulation element, positionally adjusting the optical modulation element into a predetermined position on the optical axis of the luminous flux emitted from the light source; and
fixing the at least two fluid circulation members into the insertion holes and sealing clearances between the insertion holes and the at least two fluid circulation members.

9. The optical device manufacturing method as claimed in claim 8, further including:
causing an optical image detection device to detect the luminous flux that is introduced and made emergent from the optical modulation element without sealing the cooling fluid inside the cooling chambers, plurality of fluid circulation members, and cooling fluid relay section of the optical modulation element holder,
modifying the insertion condition for the another-side end based on an optical image detected by the optical image detection device, with the optical image detection device deviated in a direction along the optical axis by an amount equivalent to the difference in length of the optical path of a luminous flux passing through the cooling chambers when the cooling fluid is not sealed in the cooling chambers of the optical modulation element holder and the optical path of a luminous flux passing through the cooling chambers when the cooling fluid is sealed in the cooling chambers of the optical modulation element holder.

10. A projector, comprising:
a light source device;
the optical device as claimed in claim 1; and
a projection optical device to magnify and project an optical image formed by the optical device.

11. A projector, comprising:
an optical device that includes:
a light source;
an optical modulation element to modulate a luminous flux emitted from the light source in response to image information to form an optical image;
an optical modulation element holder that is formed with cooling chambers having cooling fluid sealed in an interior, and that holds the optical modulation element so as to be able to transfer heat to the cooling fluid within the cooling chambers;
a plurality of fluid circulation members that are connected in communication to the cooling chambers of the optical modulation element holder and that guide the cooling fluid to an exterior of the cooling chambers and lead the cooling fluid again into the interior of the cooling chambers; and
a cooling fluid relay section that is disposed at a predetermined position relative to an optical axis of the luminous flux emitted from the light source and that relays, via the plurality of fluid circulation members, at least one of cooling fluid moving from the exterior to the interior of the cooling chambers of the optical modulation element holder, and cooling fluid moving from the interior to the exterior of the cooling chambers of the optical modulation element holder;
the optical modulation element holder defining an inflow port to allow the cooling fluid to flow into the interior of the cooling chambers and an outflow port to allow the cooling fluid inside the cooling chambers to the exterior of the cooling chambers;
the plurality of fluid circulation members including fluid circulation members that each have one-side end connected in communication to the inflow port and outflow port so that another-side end thereof protrudes in the optical axis direction of the luminous flux emitted from the light source; and
the cooling fluid relay section defining insertion holes that extend inwardly through the cooling fluid relay section and that are capable of receiving therethrough the another-side end of the fluid circulation members connected in communication to the inflow port and outflow port;

the cooling fluid relay section including a first relay section to relay the cooling fluid moving from the exterior to the interior of the cooling chambers of the optical modulation element holder and a second relay section to relay the cooling fluid moving from the interior to the exterior of the cooling chambers of the optical modulation element holder;

the optical modulation element holder including a pair of frame-like members that are formed with openings corresponding to image formation regions of the optical modulation element and that clamp the optical modulation element therebetween, and a pair of light-transmissive substrates disposed on surface sides of the pair of frame-like members opposite the opposed surfaces thereof;

the openings of the pair of frame-like members being closed, by the optical modulation element and the pair of light-transmissive substrates, on the sides of the opposed surfaces of the pair of frame-like members and on their face sides opposite the opposed surfaces, thereby forming the cooling chambers inside both the pair of frame-like members;

the inflow port, with the optical device assembled, being formed at a side end of each of the pair of frame-like members on the first relay section side;

the outflow port, with the optical device assembled, being formed at a side end of each of the pair of frame-like members on the second relay section side; and the first relay section and the second relay section defining the insertion holes, that extend inwardly through the first relay section and second relay section and that are capable of receiving therethrough the another-side end of the fluid circulation members connected in communication to the inflow port.

12. The projector as claimed in claim 11, the pair of frame-like members having a rectangular shape in plan view; and the inflow port and outflow port formed near diagonal positions of the opposed side ends of the frame-like member, the pair of frame-like members joined such that when the inflow port and outflow port of at least one of the pair of frame-like members are projected on the other frame-like member, the inflow port and the outflow port are disposed at opposed side end positions of the other frame-like member and opposite the inflow port and outflow port of the other frame-like member.

13. The projector as claimed in claim 11, the optical modulation element holder including a pair of light-transmissive substrate pressing members for pressing and fixing the pair of light-transmissive substrates to the pair of frame-like members, at least one of the pair of light-transmissive substrate processing members having support portions, the support portions defining a plurality of holes for receiving therethrough the another-side end of the fluid circulation members connected in communication to the inflow port and outflow port and which support the fluid circulation members.

14. The projector as claimed in claim 11, further including at least one optical conversion element to convert the optical characteristic of an incident luminous flux, the optical conversion element including a light-transmissive substrate and an optical conversion film that is formed on the light-transmissive substrate and that converts the optical characteristic of the incident luminous flux, and at least one of the light-transmissive substrates configuring the optical modulation element holder being the light-transmissive substrate configuring the optical conversion element.

15. The projector as claimed in claim 11, further including support members that support the fluid circulation members that are interposed between the optical modulation element holder and the cooling fluid relay section, the support members defining a plurality of holes for receiving therethrough the another-side end of the fluid circulation members connected in communication to the inflow port and outflow port.

16. The projector as claimed in claim 11, further including:

a plurality of the optical modulation elements;

a plurality of the optical modulation element holders corresponding to the plurality of the optical modulation elements; and a color combination optical device having a plurality of luminous flux incident side end faces, disposed on the plurality of the optical modulation element holders, the luminous flux incident side end faces combining luminous fluxes modulated by the plurality of the optical modulation elements, the cooling fluid relay section including: a first relay section attached to at least one of the end faces of the color combination optical device intersecting with the plurality of luminous flux incident side end faces, the first relay section having multiple branches to provide the cooling fluid to flow into the interior of the cooling chambers of the plurality of the optical modulation element holders; and a second relay section attached to another end face of the color combination optical device intersecting with the plurality of luminous flux incident side end faces, to collectively feed in the cooling fluid flowing out from the interior of the plurality of the optical modulation element holders, and the first relay section and second relay section defining insertion holes that extend inwardly through the first relay section and the second relay section and being capable of receiving therethrough the another-side end of the fluid circulation members connected in communication to the inflow ports and outflow ports of the plurality of the optical modulation element holders.

* * * * *